(12) United States Patent
Mayer

(10) Patent No.: US 8,589,373 B2
(45) Date of Patent: Nov. 19, 2013

(54) SYSTEM AND METHOD FOR IMPROVED SEARCHING ON THE INTERNET OR SIMILAR NETWORKS AND ESPECIALLY IMPROVED METANEWS AND/OR IMPROVED AUTOMATICALLY GENERATED NEWSPAPERS

(76) Inventor: Yaron Mayer, Jerusalem (IL)

( * ) Notice: Subject to any disclaimer, the term of this patent is extended or adjusted under 35 U.S.C. 154(b) by 0 days.

(21) Appl. No.: 10/939,454

(22) Filed: Sep. 14, 2004

(65) Prior Publication Data

US 2005/0114324 A1    May 26, 2005

Related U.S. Application Data

(60) Provisional application No. 60/557,454, filed on Mar. 28, 2004, provisional application No. 60/575,981, filed on May 31, 2004, provisional application No. 60/584,882, filed on Jul. 1, 2004, provisional application No. 60/602,946, filed on Aug. 20, 2004.

(51) Int. Cl.
*G06F 17/30*    (2006.01)

(52) U.S. Cl.
USPC ............... 707/706; 707/705; 707/707; 707/3; 707/4; 707/201; 707/999.003; 713/2; 726/1; 439/152

(58) Field of Classification Search
USPC ............ 707/3–5, 737, 749, 704, 708, 999.01, 707/999.003, 201, 705–707; 709/217, 238, 709/224; 715/243, 251; 713/2; 439/152; 726/1
See application file for complete search history.

(56) References Cited

U.S. PATENT DOCUMENTS 6,944,612 B2 *   9/2005   Roustant et al. ............... 707/706
7,191,399 B2 *   3/2007   Ohtani et al. .................. 715/251

OTHER PUBLICATIONS

"Context and Page Analysis for Improved Web Search", Steve Lawrence and C. Lee Giles, Internet Computing, IEEE, 1998, 9 pages total.*

* cited by examiner

*Primary Examiner* — Thanhnga B Truong

(57) ABSTRACT

System and method is provided to improve searching on the Internet or similar networks and especially improved MetaNews and/or improved automatically generated newspaper. The present invention solves the problem by creating recursive clustering, so that preferably at any level in the tree the user can preferably either choose a specific news item from the cluster or from the shown sub-clusters or continue in the tree. Another improvement is that searching the Meta News by keywords can generate an automatic newspaper in a way similar to the original automatically generated newspaper. Many additional improvements to the concept of automated newspapers and/or news MetaSearch are also shown. Other improvements are suggested for improved shareware MetaSearch, improved Web pages search, and other types of searches.

7 Claims, 17 Drawing Sheets

Condolences continue to pour in for slain Swedish Foreign Minister

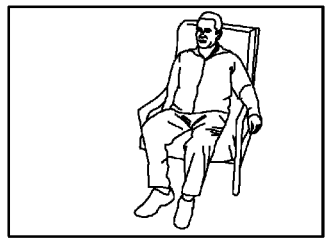

Streaming data from CNN

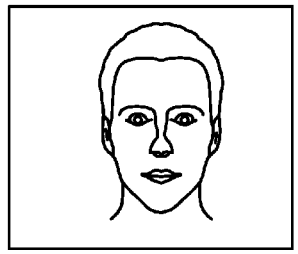

Streaming data from BBC

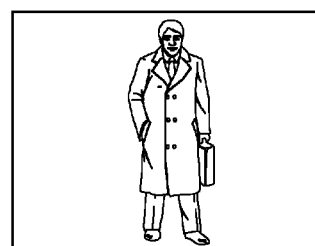

Streaming data from Sky News

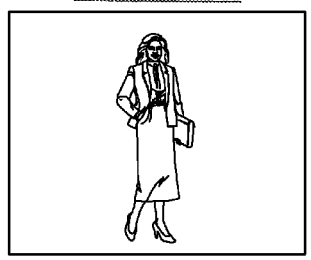

Image from Di-Ve News

FIG. 1 (1) (Prior art)

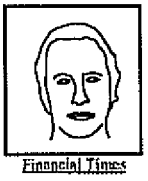

Top Stories  Auto-generated 11 Sep at 20:00 GMT

World
Canada
Business
Sci/Tech
Sport
Entertainment
Health

☑News Alerts

Text Version

About
Google News

Israeli cabinet decides in principle to expel Arafat
Toronto Star - 2 hours ago
JERUSALEM Israel's security cabinet today decided in principle to expel Yasser Arafat but put off immediate action, Israel television said.
Arafat dares Israel to kill him after cabinet vote Independent
Palestinian leader 'absolute obstacle to the process of reconciliation'
WorldNetDaily
MSNBC - ABC Online - Al Ahram - Voice of America - and 877 related »

Swedish politician dies from stab wounds
CBC News - 11 hours ago
STOCKHOLM, SWEDEN - Swedish Foreign Minister Anna Lindh died Thursday morning after she was stabbed in the arms, chest and stomach Wednesday while shopping in downtown Stockholm.
Sweden Vows Lindh Killing Won't Derail Euro Vote Reuters
Sweden weeps for stabbed minister Nzoom.com
Financial Times - Open Democracy - Bangkok Post - Forbes - and 745 related »

Canada micro-cap market files to become exchange
Forbes - and 29 related »

TECHNOLOGY BREAKDOWN (Preview): Revenge Is A Dish Best Served Cold -- How to fight the RIAA and win.
Eurweb - and 532 related »

Arvedson adds to Vancouver's Swedish content
The Globe and Mail - and 79 related »

Meg Ryan dares to bare all
NDTV.com - and 32 related »

Probable Singaporean SARS patient doing well, no fever: Health Ministry
Xinhua - and 529 related »

In the News

Human Rights     Yasser Arafat
Public Safety    South African
Mahmoud Abbas    Tony Blair
Financial Services  Middle East
Anna Lindh       Secretary of State World »

Way cleared for deal with Libya over Lockerbie
Independent -
30 minutes ago
France lifted its threat yesterday to veto the ending of sanctions on Libya after Tripoli agreed to pay broadly similar compensation to victims of the 1988 Lockerbie disaster and relatives of those killed the following year by ...

Canada »

Eves defends work on meat inspection
Toronto Star -
2 hours ago
STONEY CREEK, Ont.
Ontario Premier Ernie Eves was in defensive mode today, denying he knew anything about a year-old leaked cabinet memo about tainted-meat dangers and calling media reports about it "inaccurate and inflammatory." ...

FIG. 1 (2)

France to vote to lift Libya sanctions
NEWS.com.au
Libya to Pay More in Bombing; UN Free to Lift Sanctions New York Times
Reuters - Guardian - BBC News - FOX News - and 367 related »

Blair Is Cleared of Exaggerating Iraq Threat
New York Times -
50 minutes ago
LONDON, Sept. 11 A parliamentary committee cleared Prime Minister Tony Blair's government today of falsifying intelligence findings, but questioned its claim that Iraq could deploy unconventional weapons in 45 minutes and faulted its portrayal of Iraq as
...

British defence minister accused of withholding information on Iraq Canada.com
British Government Cleared of Sexing up Dossier Deutsche Welle
Xinhua - Sydney Morning Herald - BBC News - Financial Times - and 318 related »

Caught in the web of the Iraq tangle
Business Standard -
45 minutes ago
President George W Bush this week tried to put a brave face on the challenges he is facing in Iraq. Speaking as the anniversary of the September 11 atrocities approached, he sought to cast the American presence there in the terms under which he originally
...

Ramsey Clark Responds to Bush's Television Address Aljazeerah.info
Gibbons: "America is safer;" peace activists want troops home San Francisco Chronicle
National Review Online - Progressive.org - ABC Online - The Age - and 182 related »

McGuinty moves on tax issue
The Globe and Mail
Ont. Premier Eyes deals with tainted meat and Nipissing scandal Canada East
Ottawa Citizen - Calgary Sun - Canoe News - London Free Press - and 72 related »

Bold future seen for mobile data
The Globe and Mail - 11 hours ago
TORONTO New technology will encourage Canadians to use the Internet and data services on mobile phones and other portable devices, the head of Bell Mobility Inc. told a conference yesterday.
Brave future for data on the go Mobilemag.com
Caisse de depot set to roll $110M suit against BCI, BCE into class actions Canada.com
and 5 related »

Mounties charge first ad firm exec
Winnipeg Sun -
12 hours ago
OTTAWA -- The RCMP laid the first set of charges yesterday into its massive investigation of the federal government's controversial $40-million sponsorship program.
'First set' of charges laid in fraud scandal Canada.com
Sponsorship scandal charges laid Edmonton Sun
The Globe and Mail - CBC Montreal - Calgary Sun - Toronto Sun - and 15 related »

FIG. 2 (1) (Prior art)

Searched news for related articles. Results 1 - 30 of about 669.
Sorted by relevance  Sort by date 1. Israel Wants to Exile Arafat - - But Not Yet
Reuters, UK - 38 minutes ago
By Timothy Heritage. JERUSALEM (Reuters) - Israel decided in principle
n Thursday to exile Palestinian President Yasser Arafat after ...

2. Arafat exile would destabilise Mideast--Palestinians
MSNBC - 57 minutes ago
"Occupation is terrorism and the Israelis have to realise that if they implement
this stupid decision then they are committing a crime against their own ...

3. Arafat dares Israel to kill him after cabinet vote
Independent, UK - 1 hour ago
By Donald Macinyre in Jerusalem. Yasser Arafat, the President of the
Palestinian Authority, dared Israel to bomb him after the Israeli ...

4. Former US ambassador to Israel proposes linking Arafat expulsion ...
San Francisco Chronicle, CA - 1 hour ago
A former US ambassador to Israel proposed Thursday that Israel expel Yasser Arafat
but only if such a move is coupled with a political overture to the ...

5. Israel Says Arafat Will Be Removed
Voice of America - 1 hour ago
The Israeli security cabinet has declared Yasser Arafat an obstacle to
peace and says Israel will act to remove him. A cabinet statement ...

6. Israel Wants to Expel Arafat - But Not Yet
Reuters, UK - 2 hours ago
By Jeffrey Heller. JERUSALEM (Reuters) - Israel's security cabinet
agreed in principle on Thursday to exile Palestinian President ...

7. Israel: Leaders Meet To Discuss Next Moves As Situation ...
Radio Free Europe, Czech Republic - 1 hour ago
By Sergei Danilochkin. Israeli Prime Minister Ariel Sharon is discussing
today with top military commanders and senior cabinet ministers ...

8. Israeli cabinet decides in principle to expel Arafat
Toronto Star, Canada - 2 hours ago
JERUSALEM — Israel's security cabinet today decided in principle to expel
Yasser Arafat but put off immediate action, Israel television said. ...

9. US Opposes Arafat Expulsion
Reuters, UK - 2 hours ago
WASHINGTON (Reuters) - The United States said on Thursday the expulsion of Palestinian
President Yasser Arafat from the Palestinian territories would be ...

10. Israel Backs Arafat Expulsion in Principle-Sources
Reuters, UK - 2 hours ago
JERUSALEM (Reuters) - Israel's security cabinet agreed in principle Thursday that
Palestinian President Yasser Arafat should be exiled but opted against any ...

FIG. 2 (2)

11. Israelis Debate Arafat's Fate
CBS News - 3 hours ago
(CBS/AP) Israel must expel Yasser Arafat and should not necessarily be deterred
by US objections, the Israeli foreign minister said Thursday, ahead of a ...

12. Collapse of the road map (2)
9Economist (subscription), UK - 3 hours ago
IN ISRAELI government circles the debate after the suicide bombs in Jerusalem and
Tel Aviv was not about negotiating afresh with the new Palestinian prime ...

13. Collapse of the road map (1)
Economist (subscription), UK - 3 hours ago
An awful inevitability led to the latest outrage. The Palestinians
hope for an outside intervention that never comes. The Israelis ...

14. Israel Considers Deporting Yasser Arafat
Voice of America - 4 hours ago
Israeli troops have taken over a building near Yasser Arafat's headquarters, as
some Israeli ministers renewed their call for the Palestinian president's ...

15. Israel Mulls Arafat Expulsion
Reuters, UK - 5 hours ago
By Jeffrey Heller. JERUSALEM (Reuters) - Israel's security cabinet
met in emergency session on Thursday to consider the expulsion ...

16. Arafat supporters warn against his expulsion
Sify, India - 8 hours ago
Jerusalem: Supporters of Yasser Arafat warned Thursday against any bid to expel
the veteran Palestinian leader, as Israel's foreign minister said most of his ...

17. Israel must kill Arafat'
News24, South Africa - 9 hours ago
Jerusalem - The Jerusalem Post newspaper called on Thursday in an editorial for the
Israeli government to assassinate veteran Palestinian leader Yasser Arafat. ...

18. Israeli leaders demand expulsion of Arafat
The Hindu, India - 9 hours ago
Jerusalem, Sept. 11. (PTI): Israeli leadership and media today demanded
expulsion of Palestinian leader Yasser Arafat, despite US ...

19. Isreali troops gather near Arafat's HQ
Indian Express, India - 9 hours ago
Ramallah (West Bank), September 11: Israeli soldiers took control of the seventh
floor of the Palestinian Culture Ministry just 300 metres from Yasser Arafat's ...

20. Israel must expel Arafat: foreign minister
The Globe and Mail, Canada - 10 hours ago
Jerusalem — Israel must expel Yasser Arafat and should not necessarily be deterred
by US objections, the Israeli foreign minister said Thursday, ahead of a ...

21. Korei calls for peace as he takes top job
Independent Online, South Africa - 11 hours ago
Ramallah, West Bank - Ahmed Korei has agreed to become Palestinian prime minister
and has announced he is to form a crisis government in an attempt to halt the ...

FIG. 2 (3)

22. Israeli defence minister says 'kill Arafat'
Ananova, UK - 11 hours ago
Shaul Mofaz said expelling Arafat was the least Israel should do,
and that killing the Palestinian leader should be considered. ...

23. Arafat expulsion looms nearer
swissinfo, Switzerland - 11 hours ago
By Jeffrey Heller. "But sometimes, there are situations where you
have to make decisions independent of outside influence.". Tuesday ...

24. Qorie accepts post of Palestinian premier
Gulf News, United Arab Emirates - 14 hours ago
Palestinian parliamentary speaker Ahmed Qorei agreed yesterday to become prime minister
and said he would call an urgent session of parliament within a day to ...

25. Sharon arrives home for meeting on suicide bombs
Ireland Online, Ireland - 14 hours ago
Israeli prime minister Ariel Sharon arrived home early today after cutting short
a trip to India to consider his response to two Palestinian suicide bombings ...

26. Israelis still wary of sitting down with Qorei
Daily Star, Lebanon - 14 hours ago
Incoming Palestinian Prime Minister Ahmed Qorei acknowledged the scale of the task
he faces as he stepped into the hot seat Wednesday amid a new spiral of ...

27. Arafat should be expelled, even over US objections
San Francisco Chronicle, CA - 14 hours ago
Palestinian leader Yasser Arafat must be expelled as an obstacle to peace and Israel
should seriously consider the idea despite US objections, the Israeli ...

28. Mideast Violence Threatens 'Quartet' Plan
New York Times - 19 hours ago
WASHINGTON, Sept. 10 With attacks by both Palestinians and Israeli forces continuing,
President Bush appealed today, once again, for restraint on both sides. ...

29. Israel hits at Hamas as Sharon flies home after blasts
Telegraph.co.uk, UK - 21 hours ago
By David Blair in Rantis. Mr Sharon is expected back in Israel early
today to chair an emergency meeting of the security cabinet. ...

30. Abbas's likely heir distrusted at home but liked abroad
Financial Times (subscription), UK - 23 hours ago
By Sharmila Devi in Jerusalem. Much like Mahmoud Abbas, whom he is likely
to succeed as Palestinian prime minister, Ahmed Qurei commands ...

Fig. 3a

1. Israel Wants to Exile Arafat - - But Not Yet
Reuters, UK - 38 minutes ago
By Timothy Heritage. JERUSALEM (Reuters) - Israel decided in principle on
Thursday to exile Palestinian President Yasser Arafat after ... and 12 related »
Israeli cabinet decides in principle to expel Arafat and 3 related »
Israeli Official Favors Arafat Expulsion and 4 related »
Israel threatens Arafat after twin bombings and 2 related »
and 27 related altogether»

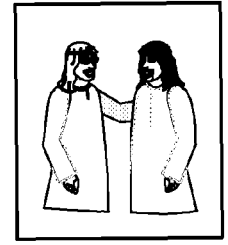

2. Arafat supporters warn against his expulsion
Sify, India - 8 hours ago
Jerusalem: Supporters of Yasser Arafat warned Thursday against any bid to expel
the veteran Palestinian leader, as Israel's foreign minister said most of his ...
and 6 related »

3. US Opposes Arafat Expulsion
Reuters, UK - 2 hours ago
WASHINGTON (Reuters) - The United States said on Thursday the expulsion of Palestinian
President Yasser Arafat from the Palestinian territories would be ...
and 5 related »

4. Arafat dares Israel to kill him after cabinet vote
Independent, UK - 1 hour ago
By Donald Macinyre in Jerusalem. Yasser Arafat, the President of the
Palestinian Authority, dared Israel to bomb him after the Israeli ...
Israel must kill Arafat
Israeli defence minister says 'kill Arafat'

5. Collapse of the road map (1)
Economist (subscription), UK - 3 hours ago
An awful inevitability led to the latest outrage. The Palestinians
hope for an outside intervention that never comes. The Israelis ...
Collapse of the road map (2)

6. Qorie accepts post of Palestinian premier
Gulf News, United Arab Emirates - 14 hours ago
Palestinian parliamentary speaker Ahmed Qorei agreed yesterday to become prime minister
and said he would call an urgent session of parliament within a day to ...
Qorei calls for peace as he takes top job
and 9 related »

7. Sharon arrives home for meeting on suicide bombs
Ireland Online, Ireland - 14 hours ago
Israeli prime minister Ariel Sharon arrived home early today after cutting short
a trip to India to consider his response to two Palestinian suicide bombings ...
Israel hits at Hamas as Sharon flies home after blasts
and 3 related »

8. Isreali troops gather near Arafat's HQ
Indian Express, India - 9 hours ago
Ramallah (West Bank), September 11: Israeli soldiers took control of the seventh
floor of the Palestinian Culture Ministry just 300 metres from Yasser Arafat's ...
foreign minister said Thursday, ahead of a ... and 4 related »

Fig. 3b

Arafat
  Arafat defiant
    Arafat Defiant Over Calls for Expulsion
      Arafat Defiant Over Calls for Expulsion
      Arafat Defiant Over Calls for Expulsion
      Arafat Defiant Over Calls for Expulsion
      Arafat Defiant Over Calls for Expulsion
      Arafat defiant as Israel threatens his expulsion
  Arafat expulsion looms nearer
    Arafat expulsion looms nearer
    Arafat expulsion looms nearer
  Kill Arafat
    Israel must kill Arafat
    Israeli defence minister says 'kill Arafat'
    Arafat dares Israel to kill him after cabinet vote
  Arafat should be expelled, even over US objections
  Arafat's Choice Sets Conditions for Acceptance
  Arafat's nominee for Palestinian prime minister, said Monday ...
  Arafat, but put off immediate action, Israel TV's Channel Two reported. ...

Qurei
Qureia accepts appointment as PM
    Qureia accepts appointment as PM
    Qorei accepts PM ' s office, will form emergency cabinet
    Qureia to accept post as Palestinian PM
    Qorei accepts nomination as Palestinian Authority prime minister
    Qorie accepts post of Palestinian premier
    Qureia new Palestinian PM
    Korei Ready to Be Palestinian PM if Conditions Met
    Ahmed Qureia has agreed to become the new Palestinian prime ...
    Ahmad Korei on the verge of replacing outgoing Palestinian PM ...
    EDITORIAL: Qurei succeeds Abbas
  Korei sets demands...
    Korei Says He Won't Be PM Under 'Israeli Dictate'
    Korei sets demands for becoming Palestinian PM
Qorei a offers unilateral ceasefire
Qorei Seeks US Guarantees before Accepting PM Post
Qurei urges Israel to step back from the brink
Qureia's challenge
Korei calls for peace as he takes top job Bush
  Bush urges new Palestinian leader to oppose terror
    Bush urges new Palestinian leader to oppose terror
    Bush Urges New Palestinian Leader to Oppose Terror
    Bush asks new Palestinian leader to stop Israel attacks
  Bush Lukewarm to New Palestinian PM
    Bush Lukewarm to New Palestinian PM
    Bush lukewarm to new Palestinian prime minister
  Bush Backs Pressure on Palestinian Militants

FIG. 3b (1)

Arafat
    Arafat defiant
        Arafat Defiant Over Calls for Expulsion
            Arafat Defiant Over Calls for Expulsion
            Arafat Defiant Over Calls for Expulsion
            Arafat Defiant Over Calls for Expulsion
            Arafat Defiant Over Calls for Expulsion
            Arafat defiant as Israel threatens his expulsion
        Arafat expulsion looms nearer
            Arafat expulsion looms nearer
            Arafat expulsion looms nearer
        Kill Arafat
            Israel must kill Arafat
            Israeli defence minister says 'kill Arafat'
            Arafat dares Israel to kill him after cabinet vote
    Arafat should be expelled, even over US objections
    Arafat's Choice Sets Conditions for Acceptance
    Arafat's nominee for Palestinian prime minister, said Monday ...
    Arafat, but put off immediate action, Israel TV's Channel Two reported. ...

Qurei
Qureia accepts appointment as PM
    Qureia accepts appointment as PM
    Qorei accepts PM ' s office, will form emergency cabinet
    Qureia to accept post as Palestinian PM
    Qorei accepts nomination as Palestinian Authority prime minister
    Qorie accepts post of Palestinian premier
    Qureia new Palestinian PM
    Korei Ready to Be Palestinian PM if Conditions Met
    Ahmed Qureia has agreed to become the new Palestinian prime ...
    Ahmad Korei on the verge of replacing outgoing Palestinian PM ...
    EDITORIAL: Qurei succeeds Abbas
Korei sets demands...
    Korei Says He Won't Be PM Under 'Israeli Dictate'
    Korei sets demands for becoming Palestinian PM
Qorei a offers unilateral ceasefire
Qorei Seeks US Guarantees before Accepting PM Post
Qurei urges Israel to step back from the brink
Qureia's challenge
Korei calls for peace as he takes top job Bush
    Bush urges new Palestinian leader to oppose terror
        Bush urges new Palestinian leader to oppose terror
        Bush Urges New Palestinian Leader to Oppose Terror
        Bush asks new Palestinian leader to stop Israel attacks
    Bush Lukewarm to New Palestinian PM
        Bush Lukewarm to New Palestinian PM
        Bush lukewarm to new Palestinian prime minister
    Bush Backs Pressure on Palestinian Militants

FIG. 3b (2)

Bush Won't Budge on Arafat, Change Roadmap

Abbas
    Abbas Steps Down, Dealing Big Blow to US Peace Plan
    Abbas's likely heir distrusted at home but liked abroad
    Abbas: I tried my best for peace Mid-East
    Mid-East at crossroads
    Mid-East blown out of control
    Mid-East braces as Hamas threatens to extend targets Sharon
    Sharon cuts off India trip
        Sharon cuts off India trip to consider harsh response to ...
        Sharon Cuts Short Trip for Urgent Meetings
    Sharon to convene security cabinet: Arafat expulsion, invasion ...

Israel
    Israeli cabinet
        Israeli cabinet decides in principle to expel Arafat
        Israeli cabinet agrees to expel Arafat
        Israeli security cabinet decides on Arafat ouster
    Israeli Official Favors Arafat Expulsion
        Israeli Official Favors Arafat Expulsion
        Israeli Official Favors Arafat Expulsion
        Israeli Official Favors Arafat Expulsion
        Israeli official says to expel Arafat
    Israel mulls fresh strikes...
        Israel Mulls Fresh Strikes, Expulsion of Arafat
        Israel mulls fresh strikes, expulsion of Arafat
    Israel threatens Arafat...
        Israel threatens Arafat after twin bombings
        Israel Threatens Arafat After Twin Suicide Bombings
Israel Considers Deporting Yasser Arafat
Israel hits at Hamas as Sharon flies home after blasts
Israel Indicates It Could Support Qureia
Israel must comply with its obligations under the "road map" peace plan or ...
Israel must expel Arafat: foreign minister
Israel set to move on Arafat
Israel tears up road map
Israel: Arafat Must Be Expelled Despite US Objections
Israeli government to assassinate veteran Palestinian leader Yasser Arafat. ...
Israeli jet targets Hamas leader
Israeli officials demand actions from Qurei
Israeli threats to put Yasser Arafat in "solitary confinement" at his ...
Israelis still wary of sitting down with Qorei
Isreali troops gather near Arafat's HQ

Fig. 4a

Israeli cabinet decides in principle to expel Arafat
Toronto Star - 2 hours ago                    Prev ⬅   ➡ Next
JERUSALEM Israel's security cabinet today decided in principle to expel
Yasser Arafat but put off immediate action, Israel television said. and 27 related »
Arafat dares Israel to kill him after cabinet vote Independent and 5 related »
Arafat supporters warn against his expulsion Sify, India and 6 related »
US Opposes Arafat Expulsion Reuters, UK and 5 related »
Palestinian leader 'absolute obstacle to the process of reconciliation' and 13 related »
MSNBC - ABC Online - Al Ahram - Voice of America - and 877 related altogether»

CBS News    Split Screen
Prev Image ⬆ ⬇ Next Image

Swedish politician dies from stab wounds
CBC News - 11 hours ago                    Prev ⬅   ➡ Next
STOCKHOLM, SWEDEN - Swedish Foreign Minister Anna Lindh died
Thursday morning after she was stabbed in the arms, chest and
stomach Wednesday while shopping in downtown Stockholm. and 42 related »
Sweden weeps for stabbed minister Nzoom.com and 10 related »
Sweden Vows Lindh Killing Won't Derail Euro Vote Reuters and 20 related »
Search widened in probe of Swedish politician's murder and 14 related »
Financial Times - Open Democracy - Bangkok Post - and 745 related altogether»

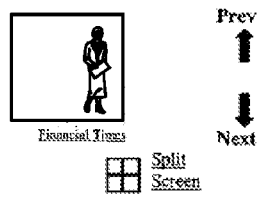
Financial Times    Split Screen
Prev ⬆ ⬇ Next

Fig. 4b

Israel Wants to Exile Arafat -- But Not Yet
Reuters, UK - 38 minutes ago              Prev ⬅   ➡ Next
By Timothy Heritage. JERUSALEM (Reuters) - Israel decided in principle on
Thursday to exile Palestinian President Yasser Arafat after ...
Israeli defence minister says 'kill Arafat' Ananova, UK and 5 related »
Arafat supporters warn against his expulsion Sify, India and 6 related »
US Opposes Arafat Expulsion Reuters, UK and 5 related »
Palestinian leader 'absolute obstacle to the process of reconciliation' and 13 related »
MSNBC - ABC Online - Al Ahram - Voice of America - and 877 related »

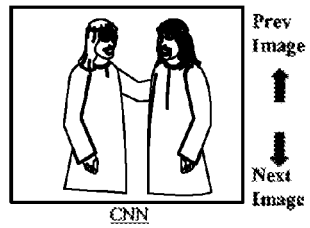
CNN
Prev Image ⬆ ⬇ Next Image

Sweden in shock as stabbed foreign minister dies
Edinburgh Evening News, UK -- 11.5 hours ago   Prev ⬅   ➡ Next
SWEDISH foreign minister Anna Lindh died in a Stockholm hospital today from
wounds she received in a knife attack while shopping. The 46-year-. ...
Funeral ceremony tomorrow will be held at.... Swedish Times and 10 related »
Sweden Vows Lindh Killing Won't Derail Euro Vote Reuters and 20 related »
Massive manhunt for killer News24, South Africa and 14 related »
Financial Times - Open Democracy - Bangkok Post - Forbes - and 745 related »

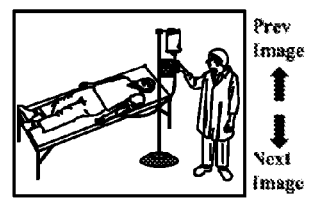
Sky News
Prev Image ⬆ ⬇ Next Image

Fig. 5

Condolences continue to pour in for slain Swedish Foreign Minister

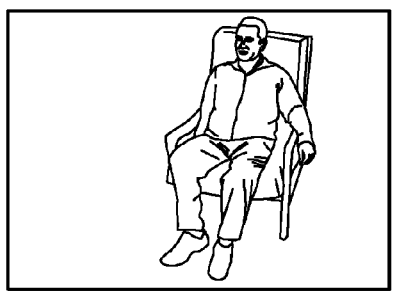

Streaming data from CNN

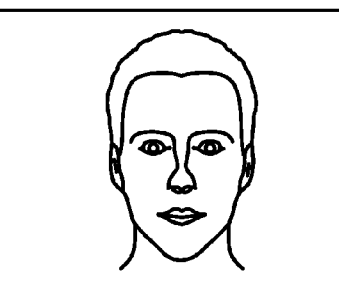

Streaming data from BBC

Streaming data from Sky News

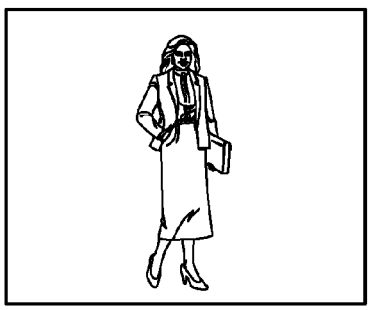

Image from Di-Ve News

Fig. 6

61- Condensed Packet

| 62- Packet Data – just 1 copy | 63- Combined header |
|---|---|
| | 64- List of preferably geographical IP target addresses |

65 – Real header
(contains mark that this is actually a condensed packet, and contains the general target area of the grouped packet)

Fig. 7a (Prior art)

1. yesterdayonce.mid
   2 MIDI files with 2 different lengths

2. "Yesterday Once - Carpenters"
   Yesonce1.mid
   2 MIDI files with the same length 3. "Yesterday Once Moer"
   oncemore.mid
   5 MIDI files with the same length 4. yesterdayoncemore.mid
   168 MIDI files with 53 different lengths 5. yesterdayoncemore[1].mid
   3 MIDI files with 2 different lengths 6. Yesterday_once_more_2.mid
   1 MIDI file 7. "YesterdayOnceMore...by...TheCarpenters"
   Carpenters_-_Yesterday_Once_More.mid
   4 MIDI files with 2 different lengths 8. yesterday_once_more-carpenters.mid
   7 MIDI files with 4 different lengths 9. Yesterday_Once_More-(Carpenters)-42k.mid
   1 MIDI file 10. YesterdayOnceMore_Carpenters_RPOcs.mid
    1 MIDI file 11. yesterdayoncemore-e.mid
    1 MIDI file

Fig. 7b 1. yesterdayoncemore.mid
   168 MIDI files with 53 different lengths 2. yesterday_once_more-carpenters.mid
   7 MIDI files with 4 different lengths 3. "Yesterday Once Moer"
   oncemore.mid
   5 MIDI files with the same length 4. "YesterdayOnceMore...by...TheCarpenters"
   Carpenters_-_Yesterday_Once_More.mid
   4 MIDI files with 2 different lengths 5. yesterdayoncemore[1].mid
   3 MIDI files with 2 different lengths 6. yesterdayonce.mid
   2 MIDI files with 2 different lengths 7. "Yesterday Once - Carpenters"
   Yesonce1.mid
   2 MIDI files with the same length 8. Yesterday_once_more_2.mid
   1 MIDI file 9. Yesterday_Once_More-(Carpenters)-42k.mid
   1 MIDI file 10. YesterdayOnceMore_Carpenters_RPOcs.mid
    1 MIDI file 11. yesterdayoncemore-e.mid
    1 MIDI file

FIG. 7c (1)

yesterdayoncemore.mid (42,945 bytes) (Exists in 37 links)

1. Carpenters
"Yesterday Once More"
Group: the carpenters
URL:...
2. SUNET's Index of /ftp/pub/music/midi/mirror.filecity/carpenters_the
Group: the carpenters
URL:...
3. SUNET's Index of /pub/music/midi/mirror.filecity/carpenters_the
Group: the carpenters
URL:...
4. SUNET's Index of /pub1/music/midi/mirror.filecity/carpenters_the
Group: the carpenters
URL:...
5. Download over 500 free midi karaoke files for the Gasman Multimedia Karaoke Editor
Group: the carpenters
URL:...
6. Motown Kid's MIDILounge - International Timeless Classics
"Yesterday Once More"
Group: the carpenters
URL:...
7. Robert Vermeulen, Midi Music
"Yesterday Once More"
Group: the carpenters
URL:...
8. MIDI
Group: the carpenters
URL:...
9. English Song
"Yesterday Once More"
Group: the carpenters
URL:...
10. Sounds and Music
"Yesterday Once More"
Group: the carpenters
URL:...
11. midi
"Yesterday once More - Carpenter , The"
Group: the carpenters
URL:...
12. POP C
"Carpenters/Yesterday_once_more"
Group: the carpenters
URL:...
13. Custard Pie Postcards--HALLOWEEN
Group: the carpenters
URL:...
14. EKN Midi's Carpenters
"Yesterday Once More"
Group: the carpenters
URL:...
15. Some Music That I Like
"Yesterday Once More"
Group: the carpenters
URL:...
16. Flabeel
"Yesterday Once More"
Group: the carpenters
URL:...

FIG. 7c (2)

17. Musics For Your HomePage
"Yesterday Once More"
Group: the carpenters
URL:...
18. Midis - Peterson's Web Site
"Yesterday Once More"
Group: the carpenters
URL:...
19. Untitled
Group: the carpenters
URL:...
20. Warehouse Index
Group: the carpenters
URL:...
21. Love Cottage ... Page 2 ... Midi Music
"Yesterday once More - Carpenters"
Group: the carpenters
URL:...l
22. Index of /Heartland/Plains/5404/music
Group: the carpenters
URL:...
23. I'll Take Romance Midi Music at Marakita's
"Yesterday Once More"
Group: the carpenters
URL:...
24. The Carpenters
"Yesterday Once More"
Group: the carpenters
URL:...
25. shadowx36 Midi Files
Group: the carpenters
URL:...
26. Dreams
"Yesterday Once More"
Group: the carpenters
URL:...
27. MIDILAND
Group: the carpenters
URL:...
28. Untitled
"Yesterday Once More"
Group: the carpenters
URL:...
29. #Anjung Humors
"Yesterday Once More"
Group: the carpenters
URL:...
30. old
"Yesterday Once More"
Group: the carpenters
URL:...
31. Index of /romance/e-love-songs
Group: the carpenters
URL:...
32. www.linkline.com - /personal/jackbenny/midi/carpentr/
Group: the carpenters
URL:...
33. The Music World
Group: the carpenters
URL:...
34. The Carpenters Midi
"Yesterday Once More"
Group: the carpenters
URL:...
35. Whats New!

FIG. 7c (3)

Group: the carpenters
URL: ...
36. VietFun - english/ Midi Music Super page
Group: the carpenters
URL: ...
37. At the Beach, from A Year to Remember... with My Mother and Alzheimer's Disease, by Brenda Parris Sibley
"Yesterday Once More"
Group: the carpenters
URL: ...

--- yesterdayoncemore.mid (24,601 bytes) (Exists in 7 links)

1. Untitled
"Yesterday Once More"
URL: ...
2. MIDI - v q
"Yesterday Once More"
URL: ...l
3. Untitled
"Yesterday Once More"
URL: ...
4. My Content\english
"Yesterday Once More"
URL: ...
5. Untitled
Embedded File
URL: ...m
6. ü k U
"Yesterday Once More"
URL: ...
7. Blade Workshop - Midi Music
URL: ...

--- oncemore.mid (42,041 bytes) (Exists in 7 links)

1. Index of /a0su/music/midi
URL: ...
2. Index of /a0su/music/pop
URL: ...
3. Hee Yun's Music Cafe - Yesterday Once More
Embedded File
URL: ...
4. Untitled
"Yesterday Once More"
URL: ...
5. Assortment of midis.
"Yesterday Once More"
URL: ...
6. Untitled
"Yesterday Once More"
URL: ...
7. Untitled
URL: ...

--- yesterdy.mid (8,430 bytes) (Exists in 5 links)

1. Midei
"Carpenters/Yesterday_once_more"
Group: the carpenters
URL: ...
2. Sweet Love Cafe
"Yesterday"

Fig. 8

|  | Created | Expires | Registered to |  |
|---|---|---|---|---|
| dating.com is unavailable. | 23-Feb-1998 | 22-Feb-2005 | *Frontier Credit Corp.* | Full Whois record |
| dating.net is unavailable | 26-May-1997 | 26-May-2005 | Donohue, James | Full Whois record |
| dating.org is unavailable | 18-Mar-1999 | 18-Mar-2005 | Qualtech Solutions | Full Whois record |
| dating.info is unavailable | 13-Jul-2002 | 13-Jul-2005 | BRANDCONCERN BV | Full Whois record |
| dating.biz is unavailable | *27-Mar-2002* | *26-Mar-2005* | Perfect Entry | Full Whois record |

SYSTEM AND METHOD FOR IMPROVED SEARCHING ON THE INTERNET OR SIMILAR NETWORKS AND ESPECIALLY IMPROVED METANEWS AND/OR IMPROVED AUTOMATICALLY GENERATED NEWSPAPERS

This patent application claims priority from Canadian application 2,443,036 of Sep. 14, 2003 and from Canadian application 2,444,774 of Sep. 29, 2004, hereby incorporated by reference in their entireties.

This application also claims priority from Canadian application 2,257,957 of Jan. 6, 2004, and from U.S. application Ser. No. 10/775,027 of Feb. 8, 2004, and from Canadian application 2,457,981 of Feb. 9, 2004, and from U.S. provisional application 60/557,454 of Mar. 28, 2004, and from U.S. provisional application 60/575,981 of May 30, 2004, and from U.S. provisional application 60/584,882 of Jun. 30, 2004, and from U.S. provisional application 60/602,946 of Aug. 17, 2004, hereby incorporated by reference in their entireties.

BACKGROUND OF THE INVENTION

1. Field of the Invention

The present invention relates to improved searching on the Internet or similar networks and especially Meta News and/or improved automatically generated newspapers, and more specifically to a system and method for improved automatic collection and displaying of news items on the Internet.

2. Background

The Internet makes it possible for users to access vast amounts of information, thus becoming effectively the world's largest library and the world's largest database. This opens up fascinating new possibilities, such as for example automatically accessing a huge amount of news sources in order to present to the user for example an automatically edited "news paper", which automatically selects the most important events or news items according to various criteria. However, one of the biggest problems is integrating efficiently vast amounts of information and analyzing it.

Google has recently made available at news.google.com an automated "newspaper", which searches continuously about 4,500 news sources, and lets users view automatically generated headlines in one of a few general areas (which are currently: Top Stories, World, US, Business, Sci/Tech, Sports, Entertainment and Health), or one newspaper divided to the above sections, or lets users search for news by keywords. In addition, users can choose between a number of possible countries (which are currently: Australia, Canada, France, Deutschland, India, Italia, New Zealand, U.K., US), and thus news items can change according to the chosen country. The automatic determination of which news items or news stories are most important is done by 3 main criteria: In how many sources the news item appeared, how important are the news sources in which it appeared, and how close is it to the top in each of these news sources.

However, many problems still remain, such as for example:
1. The current system chooses for each headline just one of the possible sources (Including the first sentence in that news item) and also a photo from one of the possible sources (typically from another source), and typically indicates below in smaller print a few additional related headline links below, and then a few additional names of news sources below, which also link to related items, and then there is a final link to typically a few hundreds of additional related links. This leads to the following problems:

a. The choice of a single main news source and a single image for each item seems arbitrary to the user and leads him to prefer this source for reading the full news item, since he has much less information about the other links.
   b. Similarly, the choice of the additional smaller links below also seems arbitrary to the user.
   c. Due to space limitations the clustering possibilities in the first page are limited, so if for example there is room for only 2-4 main news items in each category, then very board loosely related items might be presented as a single news item.
   d. If the user clicks on the final "related items" link, he typically gets hundreds or even more than a thousand links to related news items (with the headline, source, time, and the first 2 lines), sorted either by relevance or by time, however, the new list is now without any images and without any clustering, so that many times news stories that are about the same event or even identical (for example due to two or more news sources using exactly the same item from a news agency), may appear at different positions in the list of related links, and various other news items which are more different might appear between them and can be also dispersed in various places. This makes it vary hard for the user to take advantage efficiently of the list of related items. (Although clicking on the next 30 links each time may eventually show for example only for example 25-30% actual links due to removing some very similar entries, like Google does also with normal web pages results, this still leaves the shown items un-clustered, as explained above).

2. Allowing the user to choose between a few top categories is very limited by nature and does not even come close to the true potential of such systems. On the other hand, when searching by keywords, the user immediately reaches a list of results that is similar to the list that he reaches when clicking on the final list of "related items", as explained below, and thus is subject to the same limitations. Although many times this first list shows for some of the items, especially in the beginning, a few additional sub-items and a link that says "and more", clicking on the "and more" links always apparently generates only a completely linear and non-clustered list again, like in the case of clicking on the "related items" links in the automatic newspaper front page, as explained above. For example, searching for the word "Israel" in Google news shows that there are 12,600 items, and the $2^{nd}$ result has the headline *Israel Wants to Exile Arafat—But Not Yet*, with a few additional smaller links and the "and more" link. But clicking on the "and more" list brings up a linear list that says that there are 1,010 items, and now there no clustering at all (except for deleting entries as explained above). Also, sorting by date always seems to create only a linear list with no clustering at all, even when it is the first list generated by searching for the keywords. In addition, if the user chooses one of the few top level subject categories, he/she gets each time only 20 basic clusters and that's it, which can be quite frustrating, since there can be many other issues within that category that might be interesting for the user but he/she misses them because they are not within the top 20.

Thus, it would be highly desirable to have an improved News MetaSearch or improved automatically generated "Newspaper" which solves the above problems and preferably adds also many additional useful features. Other problems with other types of searches are also explained and solved below.

SUMMARY OF THE INVENTION

The present invention tries to solve the above problems by at least one of the following ways:

1. Preferably instead of one constant headline in each position the user can click on something and switch between similar headlines (preferably those that are automatically generated as most important within the specific news item), and/or for example the chosen news source changes automatically, preferably at the same position on the screen (for example changes instantly at the same position, or for example changes by using effects such as for example fade-in and fade-out or scrolling). This automatic switching can be for example between the top 1-30 automatically chosen top related headlines (preferably showing each time also the first sentence or more) and when the user clicks anywhere on that position, he/she is preferably transferred immediately to the news item that is at the position at the time that he clicks on it. Preferably each such headline (preferably with its first sentence or part of it) is kept long enough for an average user to read it (for example 30-60 seconds), and preferably even if this switching is automatic the user can interfere for example by clicking on the item or next to it, and thus move the switching for example backwards or forwards. Another possible variation is for example to allow the user to click on something near the main item in order to expend the list of switching items next to each other, preferably without changing the rest of the layout, or for example to open a menu window which allows to choose any one of them in the window. Similarly, the image preferably keeps changing (for example in correspondence with the current source that is in that place in the textual part, or independently) preferably automatically for example every few seconds, thus switching between the sources and letting the user view for example 10-30 relevant images instead of just one, which makes the whole experience already more similar to TV. This changing of the image can again be for example instantly, or for example with fade-in and fade out, or other affects. Another possible variation is to use similar preferably automatic changes also for example in the smaller links below the main link. Again, preferably if the user clicks on the image area, he/she is preferably instantly transferred to the relevant news item in the relevant news source for the image that is visible at that position at the time of clicking. Another possible variation is showing for example simultaneously more than one main link and/or more than one image for that item. Another possible variation is, when available, showing instead of still images or in addition to them, also streaming video from these news sources, however in this case the automatic switching of images is preferably either disabled so that for example the user has to click on something in order to view related streaming data from a different source or other still images, or for example each streaming source preferably remains in the position for a longer time than still images until switching to the next streaming source (or for example to the next still image).

2. Preferably if the user clicks on the "additional related items" link or searches for keywords, instead of receiving a problematic linear list as explained above in the background, he/she preferably receives a clustered list, so that the related links or the keyword search results are preferably again clustered according to the similarity of the items, thus enabling preferably recursive clustering, preferably like a tree (However, since the same news item or sub-cluster might belong to more than one cluster or sub-cluster, preferably it is shown and/or can be reached from preferably all the sufficiently relevant clusters or sub-clusters to which it belongs or is related). Another possible variation is that when clicking for example on a sub-cluster or on a news item the system displays also links to all the upper-level clusters that it belongs to, so the user can preferably also jump directly through the links to the other parallel branches when the same item or sub-cluster belongs to more than one upper-level cluster. Preferably the user can indeed choose at least between the options of ordering by time & date and ordering by relevance, but preferably this helps to create order between and/or within the sub-clusters, but preferably without interfering with the cluster structure itself. In other words, even sorting by date preferably does not contradict the clustering, unless for example the user requests explicitly to sort by date without any additional sub-clustering. Another possible variation is to allow for example also a combined sorting, so that for example the items or sub-clusters are sorted by days or by hours, and for example within each hour frame or within each day frames they are sorted for example by relevance (for example within and/or between the sub-clusters). Another possible variation is that, for example when displaying the automatically generated newspaper or the results of a new search, the results can preferably be displayed also for example by a combined sort that combines for example relevance or importance with time, so that for example the clusters and/or sub-clusters and/or items are sorted by a score which is based on a formula that is affected both by time and by relevance and/or importance. Another possible variation is to allow the user to request for example sorting, in addition or instead, also for example according to the level of reliability of the sources, so that for example such sorting is done preferably between the clusters and/or sub-clusters and/or between items within each sub-cluster, or for example a threshold of reliability is used so that, when this option is enabled, only the sources considered sufficiently reliable are listed, etc. Another possible variation is to allow for example sorting in addition or instead also on the basis of positivity of the news, so that for example the user can request to sort between and/or within the clusters and/or sub-clusters according to how good the event is and/or how positive the views expressed in them are, but that is much more complicated and depends both on subjective factors that are preferably defined by the user and on more sophisticated semantic analysis of the content. Another possible variation is to allow the user for example to request to sort the items by the country of the source, so that for example the news items are clustered in addition or instead also according to the country of the news source, so that for example the user can see if there are clear difference in the way the same news story is depicted in different countries. Instead or in addition, preferably the user can choose in this list if he/she wants to see the list with at least one photo near each item, when available, (preferably from the same item in the same source), or without photos. Preferably by clicking on a certain cluster the user can again view a list generated for that cluster, preferably again divided into smaller clusters, however at each stage preferably the user can also simply view specific news items of the cluster. Another possible variation is to let the user view for example a graphical or textual hierarchical representation which preferably shows for example at least one typical headline for each sub-cluster or for example all of its individual headlines, and preferably shows multiple levels of the hierarchy at the same time (and preferably also side-links, since it is preferably actually a graph and not a tree, as explained above), or for example the entire hierarchy from the first general cluster down to the final nodes or down to the lowest sub-clusters, so that the user can simultaneously view the multi-level structure of related types of items and choose directly to focus on the sub-cluster or sub-clusters that most interest him/her. Preferably the user can also switch for example between a graphic or textual tree mode to the mode of just seeing the clusters at each stage. This is very important, since, unlike normal web ages, news items typically refer to specific events, so if for example 500 news items refer to about 10 different but related news items, it is much more meaningful to show the various sub-clusters than to just sort them for example by relevance or by the exact time and date, since if for example 50 of them deal with the same event, it is less meaningful to define which of them is more "relevant". These improvements can have the following fascinating implications:

a. It means that by searching for interesting keywords or keywords combinations (for example "homeland security", "rain forests", "science fiction", or any other subject, common or less common), preferably the user can instantly view an automatic "newspaper" that deals with the requested subject (since clustering the first list generated according to the keywords and requesting an image near each cluster or each item can cause the list to look like the default initial automatic newspaper front page). Preferably these images are represented in the MetaNews system as links to these images in the actual news sources, in order to save space on the MateSearch system's own servers. The images can be displayed on the results page for example in the original size that they have on the source news page where they appear. Another possible variation is that for example in order to save bandwidth and/or in order to keep the size of the images under control for more regularity in the outlay of the results page, preferably the html protocol and/or the html command set is expanded to allow any image to be requested with a given size limit, so that preferably if the original image is bigger it is either truncated automatically to fit in the allowed window, or is for example automatically downscaled in order to fit completely into the allowed space (preferably this is done by the user's browser or for example by the original server). If truncation is used then preferably the improved html protocol allows the web programmer for example to specify for each image the x-y coordinates of its central point of interest, so that the transaction can automatically be around that central point. Another possible variation is that for example various heuristics are used by the browser (or by the server) in order to find the central point of interest automatically, such as for example finding the human face in the image, starting automatically from the geometrical center, etc. Another possible variation is that the Metanews system for example automatically tries to chose only or mainly images that are within a certain reasonable range of sizes.

b. It means that by using the same or similar rules recursively, the user can preferably zero-in on a specific type of news item and see in an organized way for example the same event from different angles. This can be used for example in order to read about all the implications of a certain event, and/or for example in order to analyze for example the types of responses of the world press to certain events. So for example, a news item about Israel's intent to expel Arafat, which in the prior art Google News system leads to large assortment of 827 related and partially related news items, will instead lead to a page which leads to a hierarchical tree of related types or sub-clusters of items, for example some dealing with What Israeli leaders say, some about what world leaders are saying, some about the new Palestinian Cabinet, some represent views in favor of the expulsion, some against, etc. The clusters can be for example shown all the way down to the final leaves through multiples levels of the hierarchy, or for example only for the current level, which means that preferably simply the same or similar algorithm that was used for selecting the first page is now applied for example to the selected group of 827 related items. Preferably the automatic switching between images and/or between the main items on focus (which preferably includes at least the $1^{st}$ sentence or part of it), is also applied similarly on each displayed page in the recursive sub-clustering.

3. If streaming video is used for example in a few or more of the news sources that deal with or are related to the same event (i.e. the same cluster or same sub-cluster), then preferably the user can also request for example an automatic formation of a group of these sources on the same screen so that they can be viewed simultaneously, for example like a split screen in cable TV, except that the group is preferably automatically generated dynamically according to the item of interest and according to current availability. So preferably the user can see for example a few or more preferably small streaming media images on the same screen at the same time and preferably can also for example switch the sound each time to one of them and/or for example there is a volume control near each of them. By clicking for example on or near one of them the user is preferably transferred to that source to view it normally there. Preferably the user can switch to the multi-view of the streaming images next to each other for example by clicking on something near the original preferably automatically switching image.

4. Preferably as additional new related news items come in, the headlines and/or images can be automatically updated even if the user does not click on any refresh button. For example if there is a report on a new suicide bombing in Israel, as additional details come in and the same items in the various sources become more updated or new items are added, preferably this is also automatically updated in the automatic news page that the user has in front of him (for example if the headline or the first sentence have changed or the images have changed). This is preferably done by automatic partial refresh on a need basis, as explained already in Canadian application no. 2,432,817 of Jul. 4, 2003 (and in subsequent continuations of that application in the US and Canada) by the present inventor, as explained below, and preferably by grouping identical data packets in groups so that each group contains a single copy of the identical data packet together with a multiple list of targets, so that each group preferably goes to a certain general area, and when it reaches that general area the data is preferably duplicated back into the individual packets, or into smaller groups with less targets, which are later split up into the individual packets, as explained for example in PCT application PCT/IL 01/01042 of Nov. 8, 2001 and U.S. application Ser. No. 10/375,208 of Feb. 17, 2003 by the present inventor. Similarly all the data and especially for example any streaming video images are preferably distributed this way to the large number of viewers of the automatic news (for example from the original servers to any mirror sites of the service and from any original server or mirror site to the users). As explained in the above application, these methods can be used also for example for much more efficient distribution of Video-on-Demand, for example through the Internet, or in other networks (such as for example in a TV-cable subscribers networks, if appropriate routers are used). Similarly, since servers or other data exchange programs can run also on end-user computers, for example when file-sharing programs, such as for example Kazaa or eMule, are used, the same principles of grouping together identical packets can work also there, of course. In addition, preferably when used between end users, preferably the file sharing programs choose randomly which part of the shared file to take from each user that has it, in order to avoid for example the problems that can cause eMule for example to start working much more slowly when the last few percents of the file are being downloaded. Another possible variation is that when downloading for example Video-on Demand, preferably the movie studios will offer instead of fixed movies more dynamic movies in which multiple or at least a few plot branching points exist, so that the user can for example order in advance a specific version of the movie, according to the plot twists which he/she most desires (for example according to a pre-view catalogue), or for example this might be fast enough so that the user can chose from a number of choices at each of these branching points when the movie reaches that point and then preferably the appropriate next part is downloaded almost instantly, or for example before reaching the next plot branching point all the relevant next possible choices are already downloaded automatically in the background, so that when the user makes the choice the chosen next part is already instantly available. However, since, as explained above, headlines and images preferably keep changing anyway between items of the relevant cluster or sub-clusters, preferably the user gets a different indication when the items and/or images themselves have changed (for example the same item has been updated on the news source where it resides or the image has changed) or new items or images are brought in, such as for example some sound indication, preferably accompanied with a visual indication of the new item or the item that has changed, such for example some red frame around it, and/or for example the words "Fresh update" near it, etc. The vocal indication has a further advantage, since the user can be alerted for example even if he/she is currently working on another window. Of course, like other features of this invention, these features can be used also independently of any other features of this invention.

5. In addition, if the user chooses one of the top level subject categories, preferably the number of clusters is not limited to 20 or to another specific number, so the user can continue further to the next issues for example by clicking on some type of "next items" link. This continuation can continue for example as long as the next cluster or clusters are sufficiently important (as defined for example by the number and/or importance of sources that refer to it) and/or as long as there are sufficient items and/or sufficient sub-clusters in the next cluster or clusters. In addition, instead of just a few top categories, preferably there are also sub-categories, so that choosing a top category can for example open a submenu that lets the user choose for example also a sub-category in one or more additional sub-levels.

6. Another possible variation is that when the user chooses a certain country in the general choices available for the automatically generated newspaper, the system for example allows the user to choose if he wants simply more emphasis on news related to this country, more emphasis on sources related to this country, or both. Another possible variation is that even when the user searches for news items by keywords, the system can take into account the general context of country that the user preferred (for example one of the countries available for the automatically generated main page), and so for example the sorting between and/or within clusters and/or sub-clusters preferably takes into account, in addition or instead of the normal sorting criteria (but preferably in addition and not instead), also the country to which the item refers and/or the country to which the source belongs (however, preferably, this is indicated clearly in the search results, and preferably the user has a near link for switching to keyword search results that are not affected by the country choice, and/or vice versa—giving such a link for country—related keyword search results in the results of the non-country-affected keyword search results). Another possible variation is that if the search keywords themselves contain country-related words (such as for example USA, American, Israel, Israeli, India, Indian, etc.) the search automatically gives more weight to sources from these countries, however this could be problematic if the user does not wish for this to happen, so preferably this is done only if the user requests this explicitly (for example in a set of available user options, which can become defaults until the user changes them, or for example the user has to request this each time).

7. Another possible variation is to use similar automatic recursive clustering and sub-clustering also for example in normal web searches and/or for example in news-group searches, so that the cluster and sub-clusters preferably represent for example general types of sites according to various similarities between them (for example according to keyword analysis and/or semantic analysis and/or analysis of similar link structures—for example similar incoming and/or outgoing links). (Although the normal Google web search for example allows the user to request pages similar to a certain result by looking for pages with similar links, this is used only for a given result link, and the results themselves are not displayed with any clustering). As explained in clause 2 above, preferably the clusters and sub-clusters are sorted by relevance, so that for example the cluster with the highest average page rank is on top, and preferably within it the sub-clusters with the highest average pages rank are on top, and so on preferably until the level of individual pages, so that the clustering works in synergy with the page ranking. Preferably, like in the preferred recursive sub-clustering in the News meta-search (which preferably labels clusters and sub-clusters by the title of a representative item for each cluster and sub-cluster, as shown in the example in FIGS. 4 a&b below), the search engine preferably automatically tries to label also each cluster and each sub-cluster, for example by the title of a representative page of each sub-cluster or for example the most highly ranking page of the sub-cluster or one of the most highly ranking pages, or simply the title of each sufficiently highly ranking page in each sub-cluster is listed as a link (and/or for example by some automatically preferably semantically generated title or abstract, or for example by listing keywords that are most common in the titles of pages that belong to the cluster or sub-cluster and preferably less common in the titles of the pages of the other clusters or sub-clusters, etc.). Another possible variation is that for example, preferably in addition to displaying the actual title of each sufficiently highly ranking page in each sub-cluster, the search engine can for example at least try to label automatically at least the cluster itself (for example by semantically parsing the relevant sentences that deal directly with the search word or words), so that for example if the user searches for the word sting, the search engine can preferably for example label a cluster about the signer Sting with the words "Sting (singer)", a cluster about the movie Sting with the words "The Sting (Movie)", etc. Another possible variation is to allow the user to use for example semantic qualifiers for example when using normal keyword search (for example in web searches and/or news searches and/or newsgroup searches and/or other types of searches), so that for example when the user searches for the singer sting he/she can preferably easily tell the search engine that he/she means the musician and not for example the movie "the sting" or a bee's sting. Of course in the prior art the user can for example add the word musician to the search string, but this has the disadvantage that in this case only pages about Sting which include the word musician will be shown, while other perhaps more important pages about Sting which don't include the word musician might be lost because of this. This can be done for example by defining special marks for letting the search engine know that certain words are not part of the search string itself but are intended to act as the semantic qualifier. This can be for example brackets, so that for example if the user enters the search string:
sting (musician)
or
sting (the musician)
or
sting (singer)
or
Sting (music)
then preferably the search engine knows that the user wants pages about the musician, but the word musician does not have to actually appear in the page. (Since the words in the brackets are semantic qualifiers and not part of the search string, preferably if more than one word is used in the brackets, then the search engine preferably does not regard it as an AND, but as an OR, but of course preferably gives pages a higher rank if more than one of the words in the brackets in semantically related to the page). In order to accomplish this (i.e. improve the search results based on the semantic qualifiers), preferably the search engine can for example use knowledge about synonyms and/or taxonomies, so that for example in this example any pages about sting which contain also repeated references to music directly or indirectly and/or for example in hrefs that point to them will be given preferably considerably higher rank than pages about sting that apparently have no connection to music. Preferably the search engine can know synonyms for example at least from one or more thesauruses and preferably also through automatic learning, for example based on various patterns and/or statistics (such as for example similar patterns or word combinations that appear in pages that are close on the recursive clustering analysis, wherein the clustering is based for example on keyword analysis and/or at least partial semantic analysis and/or incoming and/or outgoing links analysis. For example there are 1940 pages with the words "day after pill" and 128,000 pages with the words "morning after pill" and even 1150 pages which contain both phrases, so even without the 1150 pages the search engine can preferably understand, for example by analyzing similar patterns, that these two phrases are used very similarly on pages which are close on the recursive clustering and therefore are probably synonym phrases, even though "day" and "morning" are not normally defined as synonyms) and/or semantic understanding of pages where relevant definitions or connections are used (for example at least in some of the 1150 pages where both phrases are used it is clearly indicated that these two phrases designate the same thing). This can work even better for example if synonyms are also automatically activated or offered (for example in the form 'did you mean "Morning after pill"?' if the user searched for "day after pill", or by automatically including also the results with at least the close synonyms), as explained below. Of course these synonyms are preferably learned while spidering the web. (For example when searching for various devices or components in electronics even professional users many times have trouble finding the desired items because they are referred to by different names or different terms in different places, so preferably the search engine can for example automatically deduce the connection between the different names while spidering the web, for example based on various patterns or statistics or for example by semantically understanding references or definitions that directly link two or more names at some of the pages, etc.). Another possible variation is that the search engine can learn synonyms also for example from the behavior of users who repeatedly search for certain keywords and then change for example one or two words and repeat the search, however this might be less reliable since the engine cannot be sure of the user's intent. However, in the above example, the combination sting (musician) is better than sting (music), since even a human expert who might be performing the search for the user might not be sure from the $2^{nd}$ phrase if the user wants information about the musician Sting or for example about the music of the film Sting. Another possible variation is that the search engine preferably uses in addition or instead also for example information from the link structure (and/or other methods) in order to identify the relevant results clusters and/or sub-clusters, and then can check for example how relevant the qualifier word or words (in this example the word in brackets) is to the clusters and/or sub-clusters and/or how relevant its synonyms and/or related taxonomy items are to the clusters and/or sub-clusters. However, preferably the semantic qualifiers only help choose the most relevant clusters and/or sub-clusters, and otherwise work together with the normal page raking algorithms. Another example is if the user for example wants to find all the organizations that deal with rainforests preservation or for example a list of all the patent agents in a certain country. In this case the user can preferably enter for example the search string:

rainforests (organizations that want to preserve rainforests)

or patent agents Switzerland (offices that offer services)

and the search engine can preferably find the clusters (for example by link structure) which are most relevant semantically to the words in the brackets. Another possible variation is that the user can for example define words in the search that are preferred but not necessary, so that for example normal keywords in the search string are by default normal AND words (i.e. words that HAVE to be in the page), but for example specially marked words are only preferably in the page (i.e. they add to the page's rank if they are there, but do not HAVE to be there). These words can be marked for example by a "~" before the word (or any other convenient method of marking, or for example more than 2 levels of desirability are available). So for example if a user writes in the search string:

BBW huge ~bust "~really free"

It means that the words BBW, huge and free have to be in the page (and/or for example in hrefs that point to the page), the word bust adds to the page's rank if it's there but does not have to be there, and similarly for example the word really does not have to be there, but if the two words really free are there next to each other (for example on the page itself or on for example on hrefs that point to it) then it adds to the page's rank on the given search string. In continuation of the previous examples about semantic qualifiers, if the user for example enters instead the search string:

BBW (huge) (bust) "~really free"

then this might mean for example that the user wants also pages that have words that are synonyms of huge and of bust. However, since the semantic qualifiers don't necessarily have to be only a matter of synonyms, as explained above, another possible variation is that words for which the user wants also synonyms are marked by another mark different from the mark for semantic qualifiers (In other words, the user can mark words for which synonyms are also automatically acceptable, and in this case for example it doesn't matter if the word itself or one of its close synonyms appears on the page, or for example the amount of closeness is also taken into account and preferably the score is still higher if the word itself appears), and/or the search engine automatically offers also results with synonyms, especially for example if there are more results for the synonyms, as explained elsewhere in this application. Of course, the above features will be able to work even much better when more structured and/or tagged semantic information is explicitly included in the pages themselves, such as for example through XML or RDF (Resource Description Framework) or other semantically structured and/or tagged formats, but the advantage is that the above features can work also reasonably with normal web pages, for example by the methods described above, and thus enable results that can be much more relevant than in normal prior art keyword searches.

8. Another possible variation is that preferably the user can also, preferably easily, review also historically the automatically generated items that were on the automatic newspaper (for example in the Science/Tech section or any other section) for example a few hours ago, a few days ago, a few weeks ago, or more. Preferably the user can specify for example the time in hours and/or days to jump back (or for example once the jump size has been defined each next jump is automatically of the same size), or the user specifies for example a specific date and/or time which he/she wishes to view, and/or for example the user can press some link which automatically takes him/her back at each step for example automatically for a variable time period—determined for example automatically according to the amount of change (for example the amount of change in clusters and/or within them). For this preferably the MetaNews service preferably automatically keeps a history of the links for example with certain time jumps (such as for example every hour, or any other reasonable time gap) and/or for example every time a sufficient number of items have changed within clusters and/or clusters have changed, etc. Another possible variation is for example to save in a cache also at least some of the news item pages themselves, but that is of course less efficient.

9. Another possible variation is that for example in normal web searches and/or for example in searching the dictionary and/or the thesaurus for example in the word processor the user can search for example for synonyms of words with a specific pattern or length, or for the word itself when partial data exists (which can be very useful for example for solving cross-word-puzzles), so that for example the user can use for example question marks (or any other convenient designation) to designate unknown characters. So for example if the user is looking for a Greek island which is 6 letters long and starts with "ba", he/she can for example search for 'ba???? Greek island', or for example if the user searches for example for a synonym of the word satisfaction with 11 letters he/she can for example type 'synonym(satisfaction) ???????????' or for example 'synonym(satisfaction, 11)', etc.

10. Another possible variation is that the user can for example use wild cards in domain names, for example in the location window of the browser or in the search engine's search line, so that for example the user can type in the search line 'http://coca* annual sales' in order to get results only from world-wide sites that belong to coca-cola, or for example 'population growth statistics http://*.gov' to get results only from official government sites, etc.

11. Another possible variation is that the user can for example use various pattern marks when looking for general information, so that the user can for example type in the search engine, "distance from [1] earth to [1] moon is %N% Kilometers", which means that for example up to 1 word can be between the words "from" and "earth" and between the words "to" and "moon" and a number is expected before the word kilometers, etc., or for example the user can type: "takes %N% days" travel boat Philippines Japan. (Of course this is just an example and many other notations for the number of allowed words in between can also be used). (Although Altavista for example allows using the NEAR qualifier, it is more preferable to allow the user to limit the exact number of in-between words allowed). Another possible variation is that instead of using 'or' and brackets the user can for example use '/' to designate 'or' for a single word, which is much faster and more intuitive, so that the user can for example type at the end of the above query Kilometers/miles, or for example the user can type: "takes %N% days/hours" travel/shipment/shipping/reach boat/ship/sea Philippines Japan. However, if the '/' mark is allowed as a control command within commas, preferably the user can also indicate when he/she wants to search for a literal string that really contains the '/' or contains the percentage sign, for example by adding a '\' or any other special sign before the '/' or the '%', which means to treat the '/' or the '%' literally instead of as a control character (Using '\' to disable special characters is common for example in Unix editors). Another possible variation is to allow also for example qualifiers such as for example BEFORE or AFTER, which indicate that one or more keywords must appear in the text before or after a group of one or more other keywords (Preferably for example capitalizing the entire word means that it is a control word and not a keyword that the user is searching for). (Although for example Google already allows the user to achieve a similar effect by including a range of numbers, for example 2 . . . 40, in the search line, preferably the user can also enter a general number indicator without having to waste time thinking of an appropriate range). Another possible variation is that the user can add for example a tag that causes the results to be sorted according to this number (or numbers, if more than one number pattern is specified) (so for example the search string can be: DVD "Koi Mil Gaya" $%N%<lowest> cart) (or for example indicate this by any other way), so that for example all the sites that contain the desired keywords and the number are automatically sorted is the search results by this number in descending or ascending order, as determined by the user, or for example the sorting is only among sites which are sufficiently highly ranking according to other criteria (preferably this is also determined by the user, but sorting on the entire set of appropriate results is more preferable since it can give better answers). This is somewhat similar to using shopping metasearch, except that this gives the user much more flexibility in using such sorting for almost anything, so it can cover much more possibilities than normal shopping metasearch.

12. Another possible variation is that for example when requesting News alerts, instead of being able to request only by specific keywords (as it is for example in prior art Google News), preferably the user can for example mark a cluster or a specific sub-cluster, so that he/she is notified automatically on any new items that belong to that cluster (as explained above) or after sufficient changes have accumulated in the cluster, or for example the user can use semantic qualifiers or for example mark words in brackets, so that for example he/she will be notified also about items that contain synonyms of these words, etc.

13. Another possible variation is that when the search engine for example displays advertisements in addition to search results, based on the keywords which the user used, preferably the choice of appropriate advertisements takes into account not just the keywords themselves but also semantic and/or context related information. This can be done for example by taking into account the order of the keywords which the user used on the search and looking for example for qualifiers, such as for example "all", "not", "most", etc. However such words are rarely used in keyword searches so this would be hardly useful. A better variation is to determine the semantic meaning and/or the context based on the search results which the user clicks on (which is especially useful if the results themselves are automatically displayed in the form of recursive clustering), so that for example the advertisements are updated accordingly when the user requests the next page of results or repeats the search with similar keywords. Another possible variation is that the advertisements can be dynamically updated also on the same results page which the user already has, so that for example while the user opens new windows for some of the links and explores them, the original page is already updated based on the links which the user clicked on, for example by automatic refresh (for example by setting automatic refresh to every 30 seconds, or any other convenient time), and/or for example by automatic updates to part or parts of the page and/or streaming data to such parts, etc.

14. Another possible variation is that in order to facilitate transfer to explicit semantic tagging and/or structuring preferably developers are supplied with software that tries to automatically convert for example HTML pages into for example equivalent XML or RDF or other format, so that preferably the process is based on semantic analysis of the page and the conversion software preferably relies heavily on precompiled (and/or for example automatically learned) databases of world knowledge (such as for example various taxonomies) and preferably simply asks the user various questions when needed or when it is not sure enough (for example when ambivalent words are used). This can be much more efficient than trying to automatically extract semantic information from normal web pages because this way it can be done once for each page, and preferably with the help of the page's own developer, instead of being done on the fly (which is less efficient), or for example being done in some batch mode (so that the additional semantic data has to be stored elsewhere), without the help of the user. However, XML pages for example have a problem that special handling is needed to display them properly, and the XML format is more strict and complex, so most users avoid it, so more preferably the semantic information is added in tags that do not change anything else in the HTML format and can for example simply be ignored by ordinary browsers (or for example ignored except for some information that is useful also for the human readers). In addition, preferably each page contains at least one or a few basic tags which can be very useful, which preferably indicate at least who is the main entity behind the page and what is the page's main purpose and/or the main page genre. This can be for example in tags like:

<Organization-name: RAN>
<main-location: California, USA>
<Service-for: Global>
<main-page-purpose: describe organization, promote saving rainforests> or for example:

```

<Organization-name: RNJ & Associates>
<main-location: NY, USA>
<main-page-purpose: offer patent services>
``` or for example:

```

<Organization-name: Mayer computer services>
<main-location: Israel>
<Service-for: Global>
<main-page-purpose: provide online dating service>
```

(Of course these are just a few examples, and other tag names or structures can also be used). Even such simple tags alone can significantly help search engines to categorize for example pages related to dating sites into sites or pages who's main function is to offer a dating service, sites or pages that are mainly links to other dating sites, sites or pages that mainly review other dating sites, sites or pages that are or contain mainly articles about dating, sites or pages that are or contain mainly fiction stories about dating, etc. Such simple basic tags can for example be generated automatically by smart semantically aware search engines during the generation of the index (so that for example the search engine preferably uses information from the page itself and preferably also from other pages in the same site and/or pages that link to it and/or pages that are linked to from it, in order to understand in general what the site and/or each page of it is about and generate those tags), and/or for example suggested to the page owner by the automatic conversion software, or for example such basic tags can also be for example easily manually added by each web page owner, for example with the incentive that such pages can be more easily cataloged properly by web pages, so that for example a user searching for patent agents will much more easily find the site of a patents agents firm if the page has been tagged properly. Needless to say, adding such few simple tags at the top of each page will be much easier for almost everyone than for example converting HTML pages to XML, since experience has shown that even after quite a few years since XML has been well defined, most web masters still do not like to give up the easiness of HTML for the complexities and strict structure of XML. If these simple tags become a sufficiently wide-spread new convention, then smart web search engines will be able to even answer queries such as for example:
<List all train companies that offer passenger services, sorted by country>
Another possible variation is that for example the search engine itself automatically tries to generate these tags for each page and for example displays them in a public place and invites the page owners to correct them if there are errors (preferably of course with proper validation so that only the real page owner can correct its tags). Another possible variation is that for example in order to discourage cheating search engines with misleading information, each page is for example allowed to have only a limited number of words in the main-purpose tag and/or in other tags, so that for example if more words than the limit are used, the excess words are ignored by the search engine, or for example they lead to lowering the page's rank, and/or for example in cases of clearly misleading the search engine, the results can be banning the page completely at least for a certain time. Of course these methods can be used for any type of page, including for example pages of news items. Of course, like other features of this invention, these features can be used also independently of any other features of this invention.

15. When performing the search, preferably the user can tell the search engine for example if he/she wants to find reviews about the subject of the search, articles, service providers, links, etc. (which can then be accomplished by the search engine for example by any of the methods described for example in the above clauses). So for example if the user wants to find patent attorneys in a certain country preferably he/she can tell the search engine to show pages by patent agents who offer patent services. This can be done for example by special qualifiers added to the search string, for example:
dating (meeting people)<show me sites that offer dating services>
Of course, this is just an example and many other formats can also be used.

16. Another improvement in meta search features is that for example when displaying automatically generated news the user can preferably define the desired time span to cover (for example only the last N hours or N days, etc.), and/or for example the user can mark certain news items or clusters or sub-clusters as no longer interesting. This is very important since otherwise for example automatically generated news items such as for example in the Sci/Tech section in the Google News, can remain almost the same for many hours or even a few days, and thus the user misses other items (of course, as explained elsewhere in this application, preferably the user can continue to browse for additional automatically generated news clusters, preferably until the clusters become too small, but still this can save unnecessary distractions by skipping clusters which the user has already seen and is not interested to continue seeing new items about them). Another possible variation is that the user is notified automatically (for example by email or instant message or SMS, etc.) when a sufficient number of new clusters has become available and/or for example when a sufficient number of new items has become available in existing clusters which the user has not requested to remove, and/or for example clusters which the user has marked as especially interesting form him/her, etc. Another possible variation is that for example when sorting automatically generated news clusters the number of items in each cluster is normalized by the time factor, since clusters that have exited for a longer time (for example a few days) would normally have more items than a newer cluster (which has existed for example for 1 hour), even if the new cluster is more important, etc. Of course, various combinations of the above and other variations can also be used. Of course, like other features of this invention, these features can be used also independently of any other features of this invention.

17. Another possible variation is that for example when searching for available domain names (typically with more than one possible extension at the same time), for example in registrar sites, whenever a domain name is already taken preferably the search engine includes in each taken domain name preferably a direct link to the Whois record of that domain name and/or a link to the main home page of that domain (however the system preferably checks if the domain is connected, and, if not, preferably indicates that there is no link to the home page, instead of providing a dead link). In addition, preferably near each taken domain name at least the date when it was registered and/or the date that it expires and/or the name of the registrant is also given automatically, as shown for example in FIG. 8. (Although the example in FIG. 8 shows only a few main TLDs (Top Level Domains), preferably this includes also TLDs of various countries). This is much better than the prior art, where for example the Network Solutions search results typically list multiple TLD extensions that are already taken (such as for example .com, .net, .biz, .us, .info, etc.), but using the Whois search to check for example who registered each of them and when takes a long time. Preferably the user can also mark, for example with the mouse, a group of more than one such domains, and then for example open automatically with a single multiple Whois windows or for example multiple Windows of their sites and/or for example generate automatically a single page where the Whois data is listed for multiple domains one after the other. Another problem is that many times in this or in other searches or in general, for example when filling various forms or questionnaires, the user might have to check or uncheck multiple checkboxes.

So preferably the browser is improved so that the user can for example darken with the mouse the entire group of checkboxes and then with one command for example mark or unmark the entire group, and/or for example dragging the mouse with the left button pressed immediately marks each box on the way and dragging it with the other button pressed unmarks each checkbox on the way, or vice versa, etc.

Of course various combinations of the above and other variations can also be used. The detailed embodiments below show in more details also various implementation issues that can help solve various additional problems involved in supplying the above features.

Similar methods, but with the appropriate relevant adjustments, can be used for example for creating more sophisticated shareware meta-search service: For example shareware programs should appear in higher places in the meta search results according to at least one of the following:

a. How many of the included shareware sites list them.
 b. In which position they are listed for the given searched keywords.
 c. How important the shareware site is (so that for example larger or more central major shareware search sites are preferably given at least some higher weight).
 d. How many times they were already downloaded (in each site that gives this data, except that preferably the data is normalized by the general amount of listed downloads in that shareware site, for example by comparing it the other sharewares that are listed on the same search results page, or by keeping such data for example in general for each shareware site across multiple searches).
 e. The shareware site's rating for the shareware, if available (for example based on user votes and/or on their own editorial stuff). If based on user votes, the rating of that shareware site for the shareware it is preferably given higher weight than an editorial decision in another site, if the number of votes is given and is sufficiently large. (This rule is preferably used both between sites and across sites, so that if for example the same site shows both editorial rating and user votes for the same shareware, then preferably the user votes are preferred if a sufficiently large number of users have voted).

If the same shareware appears for example in different versions in various shareware sites, then preferably the system can for example use also the rankings of the previous versions (for example according to one or more of the above criteria) for determining the score for that shareware in general, or for example the system uses in this case clusters and sub-clusters like in the meta-news, or for example the system treats each version independently like any other shareware. Of course, various combinations of the above and other variations can also be used.

Similarly, preferably when searching for example for MIDI files on the Internet preferably the search engines are improved to enable for example automatically choosing the best MIDI files, for example by displaying first the most popular files. For example, in the current prior art the MIDI search engine musicrobot.com (which is perhaps the best MIDI search engine) enables users to find MIDI files according to song names and shows first a list of all the song names that contain the search string, so that if for example the user searches for the song "yesterday once more" but uses as search string the words "yesterday once", the results are displayed for example as shown in FIG. 7*a* below. As can be seen, the results are ordered not by the most popular entry (i.e. the file name that appears on most sites) but by being closest to the search string. In this prior art search engine, if the user then chooses to click for example on the most popular file (entry 4), he/she then gets a second division—according to the file length of the files with the same name (in increasing order), so that for example the list of results shows that a file named yesterdayoncemore.mid (with the length of 8,430 bytes) is available from 4 URLs (for which the user is given the links), a file with the same name and length of 24,601 bytes is available from 7 URLs (for which the user is given the links), etc. However, in reality, the file that appears in the largest number of URLs is usually the best MIDI version of the desired song, so this means that the user has to manually look for the file size that is available from the largest number of links, and many times there are a large number of results (especially for more popular songs) so this is cumbersome. So in order to improve this, preferably in the first stage, after the search engine chooses the set of results that are sufficiently close to the search string, preferably the search engine automatically sorts the song names by the most popular in descending order (and/or for example the similarity to the search string is also taken into account, however if the original set was chosen properly this should not be necessary since at least most of the results in the set should be relevant, and the most popular names will probably include the song that the user is actually looking for). So preferably, at least above a certain minimal sufficient closeness to the search string, preferably the results are displayed by popularity, as shown for example in FIG. 7*b* below. Secondly, after choosing the desired file name, preferably the $2^{nd}$ stage is also sorted in descending order by the number of links available for each file size, as shown for example in FIG. 7*c* below, (instead of the sorting by the file size in the prior art engine), and so the user can preferably typically with just 2 clicks of the mouse reach immediately the desired MIDI file that has the best chance of being the best version of the desired song. Another possible variation is for example to take into account also some ranking of the sources, so that for example URLs that have a higher page rank in the area of music and/or for example have other indicators of being more central and/or more authoritative, are given a higher rank (so that for example a specific MIDI file which is available from a little less sources but from more authoritative or central sources might appear before another MIDI file which is available from a little more sources). Of course, MIDI files are just an example and similar principles can be used also for other types of searches, such as for example in Shopping metasearch engines, so that for example if the user is looking for example for a combined Fax-Scanner-Printer, the system preferably helps him/her choose the specific manufacturer and model for example by sorting the models by descending order of popularity. Another possible variation is to take into account for example also some ranking factor of the sources, so that for example Online stores that are much bigger or more important can be given higher weight.

In the normal Google web pages search engine there are also a few improvements that can be made in order to solve various problems as explained below. Preferably at least one of the following improvements is done:

a. According to the thorough review of Google technology at pr.efactory.de, the normal Google PageRank algorithm, which takes into account how many incoming links each page has and how important or authoritative each linking page is (this is defined by how high is the general PageRank of the linking page), also takes into account the number of outbound links for each page, but in a negative way: pages that have more outbound links lose from their own PageRank score, and incoming links from other pages are given lower weight the more other links there are on the linking page. So for example if page A has incoming links from pages X, Y and Z (from other sites), the PageRank score of A is considerably higher if pages X,Y,Z each have on average for example 3 outgoing links than if they have on average for example 10 outgoing links each. However, this has the consequence of reducing the principle of giving more weight to links form more important or more authoritative pages, since for example a link from a directory page in Yahoo or in Open Directory would thus have a lowered value since each linking page there has typically a large number of outgoing links. On the other hand, reducing the value of the link according to the number of other outgoing links on the linking page does have the advantage that it can reduce for example the effects of submitting a web page to multiple giant junk directories just in order to increase the number of links to that page. But on the other hand, such giant junk directories might be for example artificially created in a way that works around this anyway: For example by automatically creating a special page for each linked page so that there is only one outgoing link on that page. Therefore, preferably the reduction in the weight of a link according to the number of other links on that page is preferably eliminated or significantly reduced. Instead, preferably other algorithms are used in order to automatically discover specially designed junk directories and ignoring them or giving them much lower weight. (This can be done for example by identifying automatically certain recurring patterns in such junk pages, or for example by using usage data on the linking page in order to determine the value of the links, so that if for example the linking page is in some junk directory that is hardly ever visited, then the link will naturally have a much lower weight). On the other hand, the position of the link on the page is preferably taken into account, so that a link in a higher place in the linking page is preferably given higher weight, except that preferably the system automatically notices if the links are sorted alphabetically on that page (for example if it is a page in a web directory, such as for example Yahoo or OpenDir), and in that case preferably the position is ignored since a higher position is merely the result of the linked Web page having a name that appears earlier on the Alphabet. In addition, it does not make sense at all to reduce the PageRank of page A just because page A has more outgoing links. On the contrary, typically the more important a page is, the more outgoing links it has, since pages with no outgoing links are typically end nodes that deal with more limited content. Also, the more important a site is, the more pages it typically has, but by reducing the rank due to outgoing links the Goggle PageRank algorithm actually punishes web sites for containing more pages. Therefore, another possible variation is to increase the PageRank in general for sites that have more pages and more outgoing links, except that of course incoming links from independent sites should remain much more important than outgoing links since otherwise people might add outgoing links just to boost their rank.

b. Another problem with PageRank is that it automatically gives higher scores to older pages simply due to the fact that they have been around long enough to have gathered more links to them, and, conversely, new pages might take a long time to get a high listing in Google simply because at the beginning they have no or too few links to them from other sites. In fact Google have themselves noticed this problem and tried to solve it in US patent application 20020123988, filed Mar. 2, 2001 and published Sep. 5, 2002, by incorporating also automatic usage statistics for each page (from various sources). However, first of all this does not solve the original problem, since older pages with more links, which are therefore already listed higher on the Google directory, will typically also have by definition more visitors than the new page even if the new page is indeed more relevant to the search query. Secondly, simply incorporating usage statistics into the score creates the danger of a classical "Mathew effect" of the rich getting richer and the poor getting poorer. In other words, if usage statistics are simply incorporated mathematically into the final score, then pages which currently have high usage (a high number of visitors) for any reason (for example because they gathered links to them over time and are therefore listed high in the Google search results, or for example because some new site managed to convince some journalist to write about it), then the increased usage can create a snowballing effect of higher rank in Google, and therefore more usage, etc., and vice versa, good pages which have initially low usage can enter a negative cycle of decreasing usage and being listed lower. In order to correct this dangerous problem, preferably usage statistics are used only with one or more thresholds, so that for example usage lower than a certain factor preferably does not continue to lower the score, and usage higher than a certain factor preferably does not continue to increase the score. This improvement is extremely important since it allows using usage data while using at the same time a mechanism for preventing it from causing vicious cycles (negative or positive). Another possible variation is that usage statistics are used only for modifying the value of the link in the linking page but not for modifying directly the ranking of a page. In addition, the problem of how long the page has existed is preferably solved by taking into account also historical data, so that preferably for example a page that has existed for example for 3 months and has already for example 20 valid links to it might have for example a higher score than page that has existed for 3 years and has for example 30 valid inks to it. So preferably the time factor is taken into account for determining the weight given to the number of links. (Of course the same algorithm can be used whether any valid links are taken into account or for example only links that seem to be related to the searched keywords are taken into account). Again, preferably at least some threshold is used, so that 0 links or too few links are not compensated by the fact that the page is new, but if the new page has already sufficient valid links, for example at least 10 links (or any other reasonable threshold number) from other sites that preferably do not reside on the same IP address (even if the domain name is different) and their domain is preferably not owned by the same person or organization, then the newness of the page is preferably taken into account in requiring less links at that stage. From the point of view of older sites this also makes sense, since this means that if a page for example has 50 valid links to it since it has existed for a number of years but the number of links does not continue to increase over time then probably the site is really not so important, whereas a really important site would continue to gather more links over time, thus compensating for the fact that more time has passed. However the system preferably has to use historical data to determine how long a page has existed, since it obviously cannot rely for that on any info on the page itself or on the site where the page resides. Archives such as for example the Internet archives at archive.org cannot be relied upon since not every page is indexed there, and also they contain much more data that is not necessary for this, such as for example the historical content of each page for example in 1-month jumps or any other temporal jumps. Instead, preferably the system itself, for example Google, preferably keeps historical records which can contain for example at least the URL of each page and the time when it started to appear.

c. In addition, Google typically uses also the anchor text of inbound links to determine the relevance of the linked page to the searched keywords, so that for example if the user is searching for the keywords "free sex", instead of being fooled by numerous not-really-free pages that use these words extensively to fool search engines to give them a high rank for these popular search keywords, the meaning of this is that Google in fact relies on the fact that if links in other independent sites state in the link itself that this is indeed a free sex page, then probably the human who made the link checked and found out that the linked page is really free, for example. In fact, Google itself did not invent this idea, since in the basic Google U.S. Pat. No. 6,285,999, originally filed in a provisional application on Jan. 10, 1997, and issued on Sep., 4, 2001, Larry Page indicates that this basic idea was already used before by the "World Wide Web Worm" and by "Hyperlink Search Engine", developed by IDD Information Services. On the other hand, this idea is preferably further improved to include at least some semantic analysis of the anchor href text and/or preferably also at least the surrounding nearby text, or at least for example the immediate text preceding the link. This is important since in the above example if for example the text of the link or the text preceding the link says that the following linked page are not really free sex pages or are for example only partially free, and the system only analyzes the fact that both the word free and the words sex appeared in the anchor text or near it, then the system can still be easily mislead. So preferably the analysis of the href text and/or for example the preceding or surrounding near text preferably at least takes into account some basic language structures such as for example negation words, or modifying words, such as for example "really", "partially", etc., and thus is preferably at least able to identify at least part of the meaning and/or avoid certain pitfalls that are relevant to the interpretation of the real meaning of the link.

d. Another possible improvement, which can be used also in other types of search engines or metasearch engines, is to include for example in the keywords search (for example in the general web search or in the news Meta-Search or in the newsgroups search and/or in other types of search) also synonyms, so that for example if the user searches for the keywords "deport Arafat" and the system's synonym database suggests that deport is a close synonym of expel and the system for example finds that there would be for example more or much more relevant results if the user had used the keywords "expel Arafat" instead, then the system can for example automatically include in the displayed search results also the pages that contain the keywords "expel Arafat", or for example the system asks the user if he would like to consider also for example close synonyms (and preferably remembers that as default for that user for following searches, for example in a browser cookie file), or for example the system responds in a way similar to the way that Google responds today if there is a typing error. So for example if the words "deport Arafat" lead to for example 200 relevant pages (for example in the recent news search) but the words "expel Arafat" lead to for example 470 pages, (or for example any number larger than the exemplary first 200 or any number larger by a certain minimal difference or minimal factor), then preferably the results search page can for example display the results and ask the user at the top "did you mean expel Arafat?" in this example. In this case, preferably the system also indicates to the user already with this message how many results instead would be on the other search and/or the for example number of highly ranking results and/or for example the average page rank of the top N results. More preferably, the system can ask the user for example "would you like to include also results with expel Arafat?", and in this case this message preferably indicates the number of results that would be in the combined search results and/or the for example number of highly ranking results and/or for example the average page rank of the top N results, and then if the user clicks on that link then both types of results are preferably integrated, as explained above. In summary, preferably the system can do at least one of the following: 1. Automatically include in the search results also pages that contain synonyms or close synonyms of the requested keywords. 2. Ask the user if he/she would like to include in the search results automatically also pages that contain close synonyms of the requested search keywords and remember that as default for that user for following searches. 3. Check at least close synonyms of the user's search keywords, and if there are more and/or better results with the synonyms then the system preferably asks the user for example if he/she wants to switch over to the results of the search that was based on the synonyms, and/or asks the user for example if he wants to integrate the current results with the results of the search that was based on the synonyms. If the search engine finds more than one word in the search string for which synonyms should be offered (for example according to the above criteria), then preferably the search engine offers in the same step an improved search string which preferably includes the best synonym for each of these keywords, for example according to the number of expected results (the total number of results, and/or for example the number of results with a Page rank beyond a certain value, and/or for example the average Page Rank of the top N results, etc.) (The search engine can obtain these numbers for example by actually performing the suggested search in advance in the background, or for example by estimating it according to the number of times each of the possible synonyms appears in general, which is a less exact prediction due to possible correlations, but allows much faster decisions without having to perform additional searches in advance). Another possible variation is that the search engine for example offers a number of alternative suggested search strings (preferably with the estimated number of results and/or the number of highly ranking results and/or the average page rank of the top N results, near each of them) and the user can click on the search string that he/she most likes. Another possible variation is that the search engine does not display specific alternative synonyms but simply marks to the user (for example by brackets) for which of the words in the search string the search engine recommends allowing synonyms, and then the user can authorize this without having to look at specific suggested synonyms. Another possible variation is that the search engine for example displays all the alternative synonyms that are suggested for each of the words for which adding synonyms is recommended, for example by displaying the search string with brackets in the position of these words, and for example listing the synonyms vertically one below the other within each set of brackets or for example next to each other within each set of brackets, for example: "would you like to include also results with "takes %N% days" {travel/journey} {boat/ship/freighter} Philippines Japan?. In any of the above variations of dealing with synonyms, in the integrated results the search engine can for example give a higher score to pages that contain a closer synonym than pages with a less close synonym and/or an even higher score if the page contains the exact synonym, or for example a close synonym does not reduce the score compared to the original word, especially for example if the user was asked explicitly about adding a specific synonym and agreed. This is a most significant improvement that can help users and significantly enhance the efficiency of searches, since many times the biggest problems of users is that they don't know the most appropriate keywords to search for or don't know all the most relevant ones. Similar principles can be used for example while searching for patents for example at the USPTO, since many times users can miss relevant patents for example because they are not searching properly for all the relevant keywords. Another possible variation is that if for example the search string does not produce any results or for example produces only very few results, in addition to or instead of suggesting synonyms, the search engine can for example automatically suggest to the user which alternative of removing one of the search words will lead to the best increase in results (for example in terms of more results and/or better results, i.e. for example higher page ranks of the top scoring pages, etc.) (This prediction can, again, be for example by performing the actual search in advance in the background, or for example by an estimate based on the general number of appearances of each of the words, etc.). The search engine can do this for example by displaying each of the alternative shorter search strings one below the other (preferably with the number of expected results and/or the number of highly ranking results and/or the average page ranks of the top N results, displayed next to each string) and let the user click on the alternative that he/she most prefers. Another possible variation is that if for example the search string that produced little or no results contained words that were marked as having to be next to each other (typically marked by quotation marks) the search engine can for example automatically suggest to the user which small change can lead to the best improvement in results (for example the largest increase in the number of results), for example by removal of a single word out of the quotation marks, and preferably suggesting the best word for this (for example by showing only the best recommended result and/or by indicating the estimated number of results and/or the average page rank of the top results in each alternative), or for example by relaxing the nearness requirement, so that the words in the quotation marks or for example some of them can be for example at a distance of up to 3 (or other recommended number) words from each other instead of 0 distance, etc. (In this case preferably the search engine automatically recommends the recommended amount if increase in allowed distance, etc.). Like in the case of synonyms, another possible variation is that the search engine can for example automatically suggest to the user that for example quotation marks will always automatically allow a distance of for example up to 3 (or any other recommended number) between each two words, and then this preferably remains the default for the following searches (preferably saved in a browser cookie) until the user requests to change this, and/or for example this is the normal default. Another possible variation in that the search engine can for example automatically include in the results (and/or for example ask the user once and save the reply as default until the user requests to change it and/or for example ask the user specifically in each case where it is recommended according to various criteria) also for example various inclinations, such as for example including plural where single was requested and/or vice versa, including additional forms of verbs, etc. Of course these are just a few examples and many other variations of these recommendations or of the format in which they are displayed can also be used. Another possible variation is that the response to typing errors is also improved for example by dealing also with the first letter, since in the prior art typing errors correction Google assumes that the first letter is correct, so if for example the user types by mistake Sisco instead of Cisco the prior art system does not help him/her. The correction according to the first letter preferably works by taking into account the most common types of errors (such as for example mixing up between c, s or z, etc.) and/or for example typical errors that can occur because of close characters on the keyboard, and/or an analysis of similar words that lead to significantly more results. Of course, various combinations of the above and other variations can also be used.

e. Another possible variation is for example to allow the user to define various parameters for scoring the results, preferably on certain allowed ranges, such as for example the relative weight of usage statistics, the amount of reduction of the importance of a link as a result of the total number of links on the linking page, the amount of taking into consideration the newness of a web page so that less links to it are required, etc. These values are preferably remembered for example in a browser cookie, and the system preferably displays to the user on each search the parameters that are currently effective. This can give users an additional important flexibility and control, instead of being dependent on sometimes arbitrary decisions by the search engine.

f. In addition, if usage statistics are collected, preferably from the browser or from a plug-in in the user's browser, preferably they include additional information, such as for example the typical link-clicking sequence when a user enters a site and starts going over its links, the average time the user spends on each site altogether or on each page in the site until moving to another site, etc. Such a measure is problematic since the user might for example open additional links in new windows but keep browsing the original page, so preferably the browser itself (or the plug-in) for example checks if the user is still actively moving within the page. This is why it is preferably done by the browser or by a browser plug-in, since for example routers on the way can provide statistics of requested pages for each requesting IP, but cannot know what really happens on the side of the client. In addition, preferably the browser or plug-in also requests from the user, preferably during installation, at least minimal background data, such as for example at least sex, age and education, and the user's country is preferably known automatically according to his IP or his Operating System settings.

Of course, various combinations of the above and other variations can also be used. Also, at least some of the above improvements can be used also in various meta-search engines (in addition of course to News meta search engines), so that for example a web meta search engine such as for example Metacrawler can similarly apply for example the above variations of including synonyms to the collected search results of other search engines.

DEFINITIONS AND CLARIFICATION

Throughout the patent whenever variations or various solutions are mentioned, it is also possible to use various combinations of these variations or of elements in them, and when combinations are used, it is also possible to use at least some elements in them separately or in other combinations. These variations can be in different embodiments, or different versions of the software, or sometimes different options available to choose from. In other words: certain features of the invention, which are described in the context of separate embodiments, may also be provided in combination in a single embodiment. Conversely, various features of the invention, which are described in the context of a single embodiment, may also be provided separately or in any suitable sub-combination.

BRIEF DESCRIPTION OF THE DRAWINGS

FIG. 1 is an example of the look of a typical Google automatic "newspaper" front page (prior art).

FIG. 2 is an example of the look of a typical list generated in news.google.com after clicking on the list of related items of a given item (prior art).

FIG. 3a is an example of a preferable way that the list of related items (or the list generated by searching for news by keywords) can look after clustering it again like the automatically generated front page.

FIG. 3b is an example of a preferable way that the list of related items or the list generated by searching news by keywords can look when showing multilevel sub-clustering at the same page.

FIGS. 4a-b are examples of a preferable way in which the headlines and/or the image of each item can scroll automatically between a number of sources.

FIG. 5 is an example of a preferable way in which multiple streaming video images of the same event from various Online news sources can appear on the screen side by side.

FIG. 6 is an example of a condensed packet for much more efficient distribution of the same data to multiple users.

FIGS. 7a-c are examples of preferred improved MIDI files meta-search.

FIG. 8 is an example of an improved list of domain name search results.

DETAILED DESCRIPTION OF THE PREFERRED EMBODIMENTS

All of descriptions in this and other sections are intended to be illustrative examples and not limiting.

Referring to FIG. 1, I show an example of the look of a typical Google automatic "newspaper" front page (prior art). As can be seen, the prior art system chooses for each headline just one of the possible sources as the main item (Including the first sentence in that news item) and usually also a photo from one of the possible sources (typically from another source), and typically indicates below in smaller print a few additional related headline links below, and then a few additional names of news sources below, which also link to related items, and then there is a final link to typically a few hundreds of additional related links.

Referring to FIG. 2, I show an example of the look of a typical list generated in news.google.com after clicking on the list of related items (prior art). In this case the item that was clicked on was the item about the talks about deporting Arafat. As can be seen, this generates a linear list with no clustering at all, and various items that should clearly be in the same sub-clusters are dispersed in different places.

Referring to FIG. 3a, I show an example of a preferable way that the list of related items (or the list generated by searching for news by keywords) can look after clustering it again like the automatically generated front page. As can be seen, preferably this can be very similar or even identical to the front page in any of the general areas, except that there might be for example less sub-clusters and less photos, since only some of the individual news items contain photos that can be used, so for example sometimes an entire sub-cluster might be without a photo. As explained above in the patent summary, preferably the user can switch between a mode that shows photos to a mode without, and preferably the photos and/or the main news items and/or the related smaller items below can switch for example automatically, for example every 30-60 seconds within the same area on the page and/or the user can move backwards and forwards with them. Since this is a recursion, any of the improvements described for the main page can preferably also be implemented here, such as for example all the improvements shown in FIGS. 4a & 4b. Preferably the recursive clustering continues for example until there are sufficiently few items in the final sub-category or until the items are too different to group further. As can be seen in this example, the general items about talks about expelling Arafat are now preferably divided into reasonable sub-clusters, such as for example the response of Arafat's supporters, the US response, talks about killing Arafat instead of deporting him, etc. In order to enable the smarter multi-level sub-clustering, first of all, in general, the same or similar principles are preferably applied similarly at all levels, except that in each step they are preferably applied now to the items of the previous cluster or sub-cluster in order to further divide them into additional sub-clusters.

In order to improve the clustering ability, preferably at least one or more of the following methods are used:

1. Preferably the time each item was published is taken into account, preferably with the assumption that the closer the time of publication between them, the higher the chance that two items are dealing with the same event. Another possible variation is to analyze also the temporal words or phrases used in the news item itself (preferably mainly in the headline and/or in the first few sentences), since if for example some event has occurred 30 minutes ago, then any news items that are older than that cannot be reporting about the same event (although they might have mentioned it even before the event for example in case of a prescheduled event, such as for example a sports event or press conference or a ceremony, these items will typically be different from items that describe the event itself after it has already happened). In other words, the system preferably uses this analysis to decide when the event occurred, and this time can be used for example to separate between news items that occurred before this time and items that occurred after this time and/or to help decide the similarity between items that might be referring to the same event. In order to enable this, preferably the system is able to perform also at least some minimal type of semantic analysis and/or preferably has at least knowledge of the relevant temporal nouns (such as for example months names, weekday names, relative terms, such as for example yesterday, today, tomorrow), and relevant verbs (such as for example before, after, during, on), etc. Preferably this includes also various different ways of writing the same dates or times, such as for example with numbers, with names or with abbreviated names (for example Sep. 9 instead of September 9, etc).

2. Similarly, preferably the system has at least a knowledge base of geographic areas, such as for example at least country names and city names, so that for example when the same place appears in two different news items, preferably in the headline and/or for example in the first 1 or 2 sentences, the system can give it more weight than ordinary keywords. The headline and the first 1 or 2 sentences are most important, since according to common journalistic rules, all the important information of the 5 W's should already be in there (Who, What, Were, When, and sometimes also Why). Again, preferably this includes also different ways of writing the same names, if they are exist.

3. In addition, preferably the system has a knowledge base of at least the most common or most important verbs that typically appear for example in headlines and/or in the first one or two sentences of news items (or even in entire news items). (The original verb list can be for example generated statistically automatically by analyzing a large number of news items, and then human experts preferably define the knowledge base at least for these most common or most important words). Preferably the knowledge base uses for example semantic trees and/or semantic graphs and/or various rules, so that for example the system knows that killing is much more severe than expelling or deporting, and preferably knows for example that the words "said" or "accepted" or "opposes" or "demands" refer to transfer of information (and preferably also the differences between them on various dimensions, such as for example giving each word a score on the level of negativity, level of severity, level of urgency, etc.), and that for example words like "expel" or "kill" refer to physical actions, etc. So for example each verb might be characterized by scores (for example between 0-10 or any other suitable range, or at least a binary characterization) on a number of relevant variables or dimensions, for example:

| Present | Past | Physical | Information | Pos/Neg | Reversible | Typically Done by | Typically Done to |
|---------|------|----------|-------------|---------|------------|-------------------|-------------------|
| say | said | No | Yes | Undef | Yes | Humans | Humans/Animals |
| tell | told | No | Yes | Undef | Yes | Humans | Humans/Animals |
| accept | accepted | No | Yes | Pos | Yes | Humans | Anything |
| agree | agreed | No | Yes | Pos | Yes | Humans | Anything |
| oppose | opposed | No | Yes | Neg | Yes | Humans | Humans/Rules |
| expel | expelled | Yes | No | Neg | Yes | Humans | Humans |
| deport | deported | Yes | No | Neg | Yes | Humans | Humans |
| kill | killed | Yes | No | Very-Neg | No | Humans/Animals | Humans/Animals |
| murder | murdered | Yes | No | Very-Neg | No | Humans | Humans/Animals |
| execute | executed | Yes | No | Very-Neg | No | Humans | Humans |
| execute | executed | Yes | No | undef | Yes | Humans | Action/Document |
| die | died | Yes | No | Very-Neg | No | Humans/Animals/Abstract | Self |
| break | broken | Yes | No | Neg | No | Humans/Animals | Anything |

On the other hand, a more hierarchical structure has the advantage that the words themselves can be divided into various clusters and sub-clusters and for example inherit various qualities from their parents in the tree (for example "kill", "murder", "execute" and "die" are all related to ceasing to exist). In addition or instead preferably the system includes also a thesaurus (which can be for example based on existing databases and/or learned automatically from various statistical analyzes of a large number of relevant texts). This way for example the system can know that killing Arafat is something much more negative and irreversible compared to expulsion or deporting, or at least something that is not a synonym of deporting 4. Another possible variation is to include at least a database of synonyms for the comparisons of nouns and/or of verbs, so that the system can know if two words are different or similar even without "understanding" their meaning.
5. Another possible variation is to supply the system for example in addition or instead with a knowledge base of major known political names and organizations. Preferably all or at least one or more of the above methods are also used at least for the most important other languages (Such as for example Spanish, German, French, Chinese, and Arabic) preferably with links between the corresponding words between these languages, so that the clustering can preferably work OK also across languages. However, this is less important since typically the users will want to view news items only in one language.
6. Another possible variation is to analyze the similarity between two news items not only by counting the number of occurrences of the same keywords (According to a detailed article in pr.efactory.de, Google currently relies mainly on counting the occurrence of keywords after deleting to most common and the most uncommon keywords), but also the similarity in the occurrence of word combinations, for example how many same 2-words combinations or same 3-words combinations exists in both items (or for example the same 2 words with any 1 or 2 other words between them), or for example same 4-words combinations or same 5-word combinations, etc.). Another possible variation is that this analysis is preferably done only or mainly on the headline and/or on the first 1 or 2 sentences, which should be the most informative, or the results of the analysis of the headline and/or first 1 or 2 sentences are given higher weight than the analysis of the rest of each item, or for example the importance of each next sentence is decreased according to its position. Another possible variation is for example to generate for the user also a summary of the relevant cluster or of the relevant sub-cluster for example by generating automatically the list of sentences or for example the list of first or $2^{nd}$ sentences that appeared most often in the items of the cluster or of the sub-cluster, or for example the sentences which have the largest number of sub-combinations (for example 3 word combinations) that repeat in other items of the cluster or of the sub-cluster. Another possible variation is to use this method for example to highlight the most important sentences in a given article (for example by highlighting sentences which appeared in whole or in part more that other sentences also in other items of the cluster or of the sub-cluster or for example by deleting the sentences that are not highlighted, however deleting is less preferable since it can lead to loss of context). However, since the user preferably reads the article itself in the relevant news source site, this highlighting can be added for example dynamically by a browser plug-in.
7. Another possible variation is to take into account similarity in words even if they are not exactly identical, especially for example in the headline, so that for example if a name can be spelled in more than 1 way the system will note the similarity, especially for example if the two names appear in a similar structure in two similar headlines.

Referring to FIG. 3b, I show an example of a preferable way that the list of related items or the list generated by searching news by keywords can look when showing multi-level sub-clustering at the same page. As can be seen, this has the advantage that the user can preferably see the entire tree structure with multiple levels of hierarchy and click directly on any final node (i.e. an individual news item at a certain news source), however this has the disadvantage of too much detail for clusters that might interest the user less, and altogether it is less visually appealing that the variation of FIG. 3a.

Referring to FIGS. 4a-b, I show examples of a preferable way in which the headlines and/or the image of each item can switch automatically between a number of sources. For example, the CBS news image of Arafat shown in FIG. 4a can switch automatically for example between for example 3-20 other related images (preferably determined automatically according to the number of relevant images available), so that for example each image stays for example for 5 or 10 seconds (or any other reasonable time) and the switch is for example instant or for example by fade-in and fade-out. Of course, this switching is preferably done locally on the user's browser, for example by use of Javascript, so that after the images and the headlines are loaded for the first time, the browser can easily switch between them from the local cache and/or for example from internal memory. As explained in the summary, the images or some of them might be for example also sources of streaming data, in which case preferably an image which is a source of streaming data preferably stays longer before switching over to the next image. Similarly, if the streaming data in a certain image is for example a short video clip, it can again be used preferably from the local cache or from internal memory while switching, however if it is for example a live feed from the actual event, then of course new data need to be sent. Similarly, the main item, and/or for example the sub-items or sub-headlines of the main item or main headline, can also preferably switch automatically between a number of items, for example the entire 27 items that exist in this example in the main sub-cluster of the larger cluster of 877 related items, or for example only among the for example 10 most important or most recent or most relevant of the 27 (or any other reasonable number or percent). However, this switch is preferably without scrolling effects and can be for example instantly or with some fade-in and out, and preferably each such text remains for the time needed to read it comfortably (for example 20-40 seconds). Another possible variation is to allow the user also to manually switch between the images and/or between the specific items within the main sub-cluster and/or within the sub-clusters represented by the sub-headlines, for example by adding the blue arrows for "Prev" and "Next" near the text and/or near the image, as seen in FIGS. 4a and 4b. In addition, as shown in these examples, preferably clicking on the sub-headline, for example, Arafat dares Israel to kill him after cabinet vote, will lead to the relevant specific news item, and the sub-headlines themselves preferably each have a separate link to related items next to it, so that for example each such cub-cluster has a smaller number of links related to it. For example in the example about Arafat's suggested deportation on FIG. 4b there are 5 related links to the sub-headline "Israeli defense minister says 'kill Arafat'", 6 related links to the sub-headline about the response of Arafat's supporters, 5 related links to "US opposes Arafat expulsion", and at the bottom there is the link to the list of 877 relates items, which means the entire set of items that belong to the wider cluster (however, as explains above, even clicking on this link will preferably show the list of 877 items clustered again into sub-clusters and sub-sub-clusters, etc.). Another possible variation is to add for example a similar link also next to the main item, so that it will say for example in this case and 27 related>> for example next to the first sentence of the main item, which is preferably the biggest sub-cluster, as shown in FIG. 4a. Of course, this is just an example and other similar configurations could also be used to display such clusters and sub-clusters, preferably together with their related links. Preferably the system determines which item to use as the main item of the general cluster (for example this general cluster of 877 items) by first picking the sub-cluster that has the largest number of items (and/or for example the most recent sub-cluster that is big enough relative to other sub-clusters) and then picking for example the item within this largest sub-cluster (or otherwise chosen first sub-cluster) which has for example the highest average similarity to other items in that sub-cluster and/or for example belongs to the largest sub-cluster of that sub-cluster and/or for example is most relevant within the cluster or within the sub-cluster and/or for example is most recent within the cluster or within the sub-cluster, etc. So if for example the entire large cluster of clusters that relates to Arafat's suggested deportation has 877 items, and for example there are 27 items in the cluster about Israel deciding to deport Arafat, and other sub-clusters have less items, then this naturally becomes the main sub-cluster from which the main item or items are chosen, and for example the next two largest sub-clusters become the next two sub-headlines, etc. Another possible variation is for example to put first the more recent sub-cluster for example if it is large enough or for example if the difference in size between it and a larger less recent sub-cluster is small enough.

Referring to FIG. 5, I show an example of a preferable way in which multiple streaming video images of the same event from various Online news sources can appear on the screen side by side. If streaming video is used for example in a few or more of the news sources that deal with the same event, then preferably the user can also request for example an automatic formation of a group of these sources on the same screen, like a split screen in cable TV for example, except that the group is preferably automatically and dynamically generated according to the item of interest and according to availability in the various sources. So preferably the user can see for example 4 or 9 (or any other reasonable number of) small streaming media images on the same screen and preferably for example switch the sound each time to one of them (or for example the sound is not enabled in order to force the user to go to the actual site if he wants also the sound), and then by clicking for example on one of them the user is preferably transferred to that source to view it normally there. Preferably the user can switch to the multi-view of the streaming images next to each other for example by clicking on something near the original preferably automatically switching image, for example the icon of a split screen or the words "Split Screen", shown next to the images in the example of FIG. 4a, so that preferably the split screen is created automatically by expanding the switching available still images and/or streaming images to appear together side by side. Preferably the split screen can contain for example also some normal images instead of just streaming data. If there are for example 20 available images for a certain cluster or sub-cluster, out of which for example 5 images contain steaming data, then preferably the system organizes first of all the streaming data images next to each other, and adds afterwards the still images. Since 20 images in this example might not fit on one screen, then either the user can use for example the browser's scroll lever on the side to view the rest of the images, or for example only 9 or 12 images are shown and the others for example continue to switch automatically or the user can for example press some button to switch between more than 1 split screens that were created. Preferably the streaming data or any other data is supplied to the users more efficiently by the same mechanisms explained in the reference to FIG. 6. Preferably if one of the sources for example stops broadcasting the relevant streaming data, it can automatically be removed from the split screen or for example is replaced with a relevant still image, and if for example a new relevant data stream becomes available from another source, it can preferably be automatically added by the system to the split screen.

Referring to FIG. 6, I show an example of a condensed packet for much more efficient distribution of the same data to multiple users. As explained in the patent summary, Preferably as additional new related news items come in, the headlines are automatically updated even if the user does not request any refresh. For example if there is a report on a new suicide bombing in Israel, as additional detail come in and the same items in the various sources become more updated or new items are added, preferably this is also automatically updated in the automatic news page that the user has in front of him (for example if the headline or the first sentence have changed or the images have changed). This is preferably done by automatic partial refresh on a need basis, as explained already in Canadian application no. 2,432,817 of Jul. 4, 2003 (and in subsequent continuations of that application in the US and Canada) by the present inventor, as explained below, and preferably by grouping identical data packets in groups so that each group contains a single copy of the identical data packet together with a multiple list of targets, so that each group preferably goes to a certain general area or direction, and when it reaches that general area the data is preferably duplicated and split up into the individual packets, or into smaller groups with less targets, which are later split up into the individual packets, as explained for example in PCT application PCT/IL 01/01042 of Nov. 8, 2001 and U.S. application Ser. No. 10/375,208 by the present inventor. This is preferably done in combination with using a preferably hierarchical system of routers and Physical (geographical) IP addresses (preferably for example GPS based), as explained also in these applications. Similarly preferably all the data and especially for example any streaming video images are preferably distributed this way to the large number of the automatic news viewers. As explained in these applications, this efficient distribution can be used for example both when sending data to users and when sending data to various proxies or mirror sites such as for example Akamai servers. (Although in general the system can work OK also without these optimizations, this helps speed up the net considerably in general and is especially important for example when sending streaming data to multiple users. The streaming data is of course preferably displayed through a direct link to the source sites themselves). Of course this can also be done for example by multicast, however multicast requires explicitly joining a specific multicast group, whereas the above optimizations can be done automatically and much more flexibly and can be applied in multiple steps or sections along the way. Another possible variation is to implement the above routing optimizations for example by creating automatically and preferably dynamically multicast groups and/or sub-groups and assigning automatically users to them (and preferably removing them automatically for example when the user's browser is no longer on the page), preferably according to geographic location. This means that the implementation can work in a way similarly to the above described optimizations, but for example instead of keeping the list of target addresses in the condensed packet, for example the list of targets is sent first for example to a server or router in the target area, and then the following condensed packets for the same group can be sent for example to that server or router without the list of targets and instead the condensed packets include for example a code that identifies the multicast group and/or the desired list of targets that the server or router in that area already has. Of course, like in the above optimizations, the distribution paths are preferably based on the hierarchical routers system with geographic IP addresses (like in a hierarchical road system) as explained in the above patent, thus achieving very high efficiency. Another possible variation is for example to use the above-described sending in advance of the target lists even without defining the users in that area as a multicast group. Another possible variation is to allow the automatic creation of multicast groups or sub-groups and automatic joining and removing of users in them also without geographical IP addresses, for example by using the path of different users' browser requests to determine who is close to each other according to their paths, although this is of course less efficient and less reliable than when physical (geographical) IP addresses are used. Of course, like other features of this invention, the above variations of the optimizations can be used also in general for routing and bandwidth optimization, regardless of any other features of this invention.

However, since, as explained above, headlines and images preferably keep changing anyway between items of the relevant cluster or sub-clusters, preferably the user gets a different indication when the items themselves have changed or new items or images are added, such as for example some sound indication, preferably accompanied with a visual indication of the new item, such for example some red frame around it, and/or for example the words "Fresh update" near it, etc. The vocal indication has a further advantage, since the user can be alerted for example even if he is currently working on another window.

The automatic partial refresh is preferably done as follows: In order to save bandwidth for example the html protocol is preferably changed so that it is possible to define for example "refresh on a need basis", which means that the refresh command is initiated automatically by the site when there is any change in the page (so that the browser can get a refresh even if it didn't ask for it), or for example the browser asks for refresh more often (for example every 20 seconds or even less), but if nothing has changed then the browser gets just for example a code that tells it to keep the current page or window as is. The first of these two variations is more preferable since it saves also the waste of bandwidth by unnecessary refresh requests by the browsers. In addition, when the refresh is sent, preferably it can be a smart refresh, which tells the browser preferably only what to change on the page instead of having to send the entire page again. Another possible variation is to implement this "refresh on need" for example by active X and/or Java and/or Javascript and/or some plug-in or other dynamic code that is updated only when there is a need for it. Another possible variation is for example to keep the page open like a streaming audio or video so that the browser always waits for new input but preferably knows how to use the new input for updating the page without having to get the whole page again and preferably doesn't have to do anything until the new input arrives. Of course, like other features in this invention, the above features or variations can be used also independently of any other features of this invention, for example also independently of any Metasearch or automatic "newspaper" application.

The structure of automatically condensed identical packets is illustrated in FIG. 6. Preferably the condensed packet (61) contains just a single copy of the identical data (62) and an extended header (63), which contains a normal header (65) (preferably with a mark that indicates that this is actually a condensed packet), and a list (64) of the preferably physical (geographic) IP target addresses of the original packets that contained the same identical data in their body and were condensed in this group. So, for example, when sending the same streaming data (or any other same data) for example to millions of users at the same time, preferably one or more such condensed packets are created, preferably by the sending web server, and each condensed packet goes to a certain general target area, and as it reaches the general target area the condensed packet is preferably replicated and regrouped into smaller groups, each containing less target addresses, and eventually replicated back to single packets with a single target address each, as the packet nears its final destination. As explained in the above mentioned applications, this can lead to huge savings both in terms of bandwidth and in terms of the number of routing decisions that have to be made on the way.

While the invention has been described with respect to a limited number of embodiments, it will be appreciated that many variations, modifications, expansions and other applications of the invention may be made which are included within the scope of the present invention, as would be obvious to those skilled in the art.

I claim:

1. A method for an improved News Meta-Search over a large number of Online news sources on the Internet or similar networks, comprising providing a meta-search system which includes at least one server, and displaying news items to a user through a browser on a computer,
   wherein the server performs, under software instruction from the meta-search system, at least one of the steps of:
   i. Switching between news items from the same cluster or sub-cluster which are displayed in a given position in an automatically generated newspaper page, wherein said switching is done automatically or with user intervention; and
   ii. Switching between news images from the same cluster or sub-cluster which are displayed in a given position in an automatically generated newspaper page, wherein said switching is done automatically or with user intervention, and wherein said images are at least one of still images and streaming data;
   wherein at least one of the following features exists:
   a. Recursive sub-clustering is performed and the recursive sub-clustering continues until there are sufficiently few items in the final sub-category or until the items are too different to group further;
   b. If the user searches for keywords in the News Meta Search, the results are displayed recursively in clusters and sub-cluster in a way similar to the automatically generated newspaper page;
   c. If the user searches for keywords in the News Meta Search, the results can have all the features that exist in the automatically generated newspaper page;
   d. The system enables the user to switch between a mode that displays also images and a mode without images;
   e. The same news item or same sub-cluster can belong to more than one cluster or sub-cluster, and thus it is shown and/or can be reached from all the sufficiently relevant clusters or sub-clusters to which it is related;
   f. The system enables the user to request to sort a list of related items by relevance and/or by time and date to create order between and/or within the sub-clusters, so that the system performs the sorting without interfering with the cluster structure itself;
   g. The system enables the user to request to sort the items by at least one of: 1. The country of the source, so that the system orders or clusters the news items in addition or instead also according to the country of the news source, 2. The level of reliability of the source, so that the system orders or clusters the news items in addition or instead also according to the reliability of the news source;

h. The system enables the user to view a graphical or textual hierarchical representation which shows simultaneously the multi-level structure of clusters and sub-clusters, showing more than two levels of the hierarchy at the same time, or showing the structure down to the end-nodes;

i. The Meta News system automatically chooses only images that are within a certain reasonable range of sizes;

j. As additional new related news items come in, the headlines and/or the images can be automatically updated even if the user does not click on any refresh button;

k. The user gets a different indication when the items or images themselves have changed or new items or images are brought in (compared to the normal swapping between items), and said indication is at least one of sound indication and visual indication of the item that has changed or the new item that has been inserted;

l. The html protocol and/or the html command set is expanded to allow an image to be requested with a given size limit, so that if the original image is bigger it is either truncated automatically to fit in the allowed window, or is automatically downscaled in order to fit completely into the allowed space;

m. The html protocol and/or the html command set is expanded to allow an image to be requested with a given size limit, so that if the original image is bigger it is truncated automatically to fit in the allowed window and for said truncation the improved html protocol allows the web programmer to specify for each image the x-y coordinates of its central point of interest, and/or various heuristics are used by the browser or by the server in order to find the central point of interest automatically;

n. When switching images contain also streaming data, at least one of the following is done: 1. Automatic switching of images is disabled so that the user has to click on something in order to view related streaming data from a different source or other still images, and 2. Each streaming source remains in the position for a longer time than still images until switching to the next streaming source or to the next still image;

o. The system determines which item to use as the main item of the general cluster by at least one of: 1. First picking the sub-cluster that has the largest number of items and/or the most recent cluster that is big enough relative to other sub-clusters, 2. Picking the item within the chosen first sub-cluster which has the highest average similarity to other items in that sub-cluster and/or belongs to the largest sub-cluster of that sub-cluster and/or is most relevant within the cluster or within the sub-cluster and/or is most recent within the cluster or within the sub-cluster;

p. When requesting News alerts, instead of being able to request only by specific keywords, the system enables the user to also at least one of: 1. Mark a cluster or a specific sub-cluster, so that he/she is notified automatically on any new items that belong to that cluster or after sufficient changes have accumulated in the cluster, 2. Use semantic qualifiers, 3. Mark words in a way that indicates that synonyms should also be checked for these words, so that he/she will be notified also about items that contain synonyms of these marked words;

and wherein at least one of the following features exists:

q. In order to improve the clustering ability, the time the items were published is taken into account, with the assumption that the closer the time of publication between them, the higher the chance that two items are dealing with the same event;

r. Temporal words or phrases used in the news item are used to decide when the event occurred, and this time is used to separate between news items that occurred before this time and items that occurred after this time and/or to help decide the similarity between items that might be referring to the same event;

s. Temporal words or phrases used in the news item are used to decide when the event occurred, and in order to analyze the temporal phrases used in the item, the system is able to perform also at least some minimal type of semantic analysis and/or has at least knowledge of the relevant temporal nouns and relevant verbs; and t. When sorting automatically generated news clusters the number of items in each cluster is normalized by the time factor, since clusters that have exited for a longer time would normally have more items than a newer cluster even if the new cluster is more important.

2. The method of claim 1 wherein the system enables the user to request to automatically spread still images and/or streaming images of the same cluster or sub-cluster together next to each other so that they can be viewed simultaneously, and at least one of the following features exists:

a. By clicking on or near one of the simultaneous streaming data images the user is transferred to that source to view it normally there;

b. The system enables the user to switch the sound between simultaneous streaming data sources;

c. The group of images is automatically and dynamically generated according to the item of interest and according to availability in the various sources, so that images or streaming date can be automatically added or removed accordingly.

3. The method of claim 1 wherein as additional new related news items come in, the headlines and/or the images can be automatically updated even if the user does not click on any refresh button and wherein said automatic updating is done by partial refresh on a need basis by at least one of the following ways:

a. The refresh command is initiated automatically by the site when there is any change in the page, so that the browser can get a refresh even if it didn't ask for it;

b. The browser can ask for refresh, but if nothing has changed then the browser gets just a code that tells it to keep the current page or window as is;

c. When the refresh is sent, it is a smart refresh, which tells the browser only what to change on the page instead of having to send the entire page again.

4. The method of claim 1 wherein at least one of the following features exists:

a. In order to enable the multi-level sub-clustering the same or similar principles are applied similarly at all levels, except that in each step they are applied now to the items of the previous cluster or sub-cluster in order to further divide them into additional sub-clusters;

b. For clustering the system analyses the similarity in the occurrence of combinations of two or more words in the headline and/or in the first 1 or 2 sentences and/or in the entire item.

5. The method of claim 1 wherein the system has at least one of:
   a. A knowledge base of at least one of: country names, city names, and other geographical areas;
   b. A knowledge base of at least the most common or most important verbs that typically appear in headlines and/or in the first one or two sentences of news items and/or in entire news items;
   c. A knowledge base of verbs that uses semantic trees and/or semantic graphs and/or various rules, so that each verb can be characterized by scores on a number of relevant variables or dimensions;
   d. A database of synonyms for the comparisons of nouns and/or of verbs, so that the system can know if two words are different or similar even without "understanding" their meaning;
   e. A knowledge base of major known political names and organizations;
   f. The ability to take into account also similarity in words at least in the headlines, even if they are not exactly identical.

6. The method of claim 1 wherein at least one of the following features exists:
   a. If the user chooses one of the top level subject categories, the number of clusters is not limited to a specific number, so the system enables the user to continue further to the next issues as long as the next cluster or clusters are sufficiently important and/or as long as there are sufficient items and/or sufficient sub-clusters in the next cluster or clusters;
   b. Instead of just a few top categories in the automatically generated newspaper, there are also subcategories, so that choosing a top category can open a submenu that lets the user choose also a sub-category in one or more additional sub-levels;
   c. When the user chooses a certain country in the general choices available for the automatically generated newspaper, the system allows the user to choose if he wants more emphasis on news related to this country, more emphasis on sources related to this country, or both;
   d. Automatic recursive clustering and sub-clustering is used also in normal web searches and/or in newsgroup searches;
   e. The switching between items and/or between images of the same cluster and/or sub-cluster is done locally on the user's browser, so that after the images and the headlines are loaded for the first time, the browser can easily switch between them from the local cache and/or from internal memory, until real new data is sent again;
   f. Sending the same data to many users or to many servers or minor sites at the same time so that identical data packets are sent only once in each condensed packet by creating automatically multicast groups and/or sub groups and assigning automatically users to them;
   g. Instead of keeping the list of target addresses in the condensed packet, the list of targets is sent first to a server or router in the target area, and the following condensed packets for the same group can be sent to that server or router without the list of targets and instead the condensed packets include a code that identifies the multicast group and/or the desired list of targets that the server or router in that area already has.

7. The method of claim 1 wherein when displaying automatically generated news at least one of the following features exists:
   a. The system enables the user to define the desired time span to cover;
   b. The system enables the user to mark certain news items or clusters or sub-clusters as no longer interesting;
   c. The user is notified automatically when a sufficient number of new clusters has become available and/or when a sufficient number of new items has become available in existing clusters which the user has not requested to remove, and/or in clusters which the user has marked as especially interesting for him/her;
   d. The system enables the user to review historically the automatically generated items that were on the automatic newspaper or on a specific section of the automatic newspaper, by at least one of: 1. Specifying the time in hours and/or days to jump back, 2. Specifying the time in hours and/or days to jump back, and then jumping automatically the same interval in the next jumps, 3. Specifying a specific date and/or time, 4. The system enables the user to press some link which automatically takes him/her back at each step automatically according the amount of change.

* * * * *